(12) United States Patent
Noda et al.

(10) Patent No.: US 9,674,130 B2
(45) Date of Patent: *Jun. 6, 2017

(54) INFORMATION PROCESSING APPARATUS, INFORMATION PROCESSING METHOD, AND PROGRAM

(71) Applicant: SONY CORPORATION, Tokyo (JP)

(72) Inventors: Takurou Noda, Tokyo (JP); Yasushi Okumura, Tokyo (JP)

(73) Assignee: Sony Corporation, Tokyo (JP)

( * ) Notice: Subject to any disclaimer, the term of this patent is extended or adjusted under 35 U.S.C. 154(b) by 263 days.

This patent is subject to a terminal disclaimer.

(21) Appl. No.: 14/529,712

(22) Filed: Oct. 31, 2014

(65) Prior Publication Data

US 2015/0089390 A1   Mar. 26, 2015

Related U.S. Application Data

(63) Continuation of application No. 13/156,287, filed on Jun. 8, 2011, now Pat. No. 8,880,626.

(30) Foreign Application Priority Data

Jun. 21, 2010   (JP) ................................. 2010-140569

(51) Int. Cl.
| | |
|---|---|
| G06F 15/16 | (2006.01) |
| H04L 12/58 | (2006.01) |
| G06Q 10/10 | (2012.01) |
| G06F 3/0481 | (2013.01) |

(52) U.S. Cl.
CPC ............ *H04L 51/22* (2013.01); *G06F 3/0481* (2013.01); *G06Q 10/107* (2013.01); *H04L 12/5895* (2013.01); *H04L 51/38* (2013.01)

(58) Field of Classification Search
CPC ....................................................... H04L 51/22
See application file for complete search history.

(56) References Cited

U.S. PATENT DOCUMENTS

| | | | | |
|---|---|---|---|---|
| 4,648,706 | A * | 3/1987 | Shibasaki | G03B 27/6242 355/43 |
| 5,194,945 | A * | 3/1993 | Kadowaki | H04N 1/62 358/520 |
| 5,818,435 | A | 10/1998 | Kozuka et al. | |
| 5,926,605 | A * | 7/1999 | Ichimura | H04N 5/781 360/72.1 |
| 7,290,056 | B1 | 10/2007 | McLaughlin | |
| 7,315,826 | B1 * | 1/2008 | Guheen | G06F 17/3089 703/27 |
| 7,668,879 | B2 | 2/2010 | Vivian et al. | |
| 2002/0093583 | A1 | 7/2002 | Ito | |
| 2003/0086686 | A1 | 5/2003 | Matsui et al. | |

(Continued)

FOREIGN PATENT DOCUMENTS

JP    2008-263385    10/2008

*Primary Examiner* — Gerald Smarth
(74) *Attorney, Agent, or Firm* — Paratus Law Group, PLLC

(57) ABSTRACT

There is provided an information processing apparatus including an operation unit acquiring an input operation for a message composed of at least one of text and an image, a recording control unit recording the message in accordance with the acquired input operation, and a reproduction control unit reproducing the recorded message to display the message on a display unit.

12 Claims, 18 Drawing Sheets

(56) References Cited

U.S. PATENT DOCUMENTS

| | | |
|---|---|---|
| 2003/0091329 A1 | 5/2003 | Nakata et al. |
| 2003/0179223 A1 | 9/2003 | Ying et al. |
| 2005/0053361 A1 | 3/2005 | Jung et al. |
| 2007/0067707 A1 | 3/2007 | Travis et al. |
| 2008/0106513 A1 | 5/2008 | Morotomi et al. |
| 2009/0282101 A1* | 11/2009 | Lim ..................... G06F 9/5077 709/203 |
| 2009/0300520 A1* | 12/2009 | Ashutosh ............ H04L 12/1831 715/756 |
| 2010/0026803 A1* | 2/2010 | Yamaguchi ............ A61B 3/113 348/143 |
| 2011/0026063 A1* | 2/2011 | Nakai ................ H04N 1/00013 358/1.14 |
| 2011/0314113 A1 | 12/2011 | Noda et al. |
| 2014/0082689 A1 | 3/2014 | Christiaens et al. |

* cited by examiner

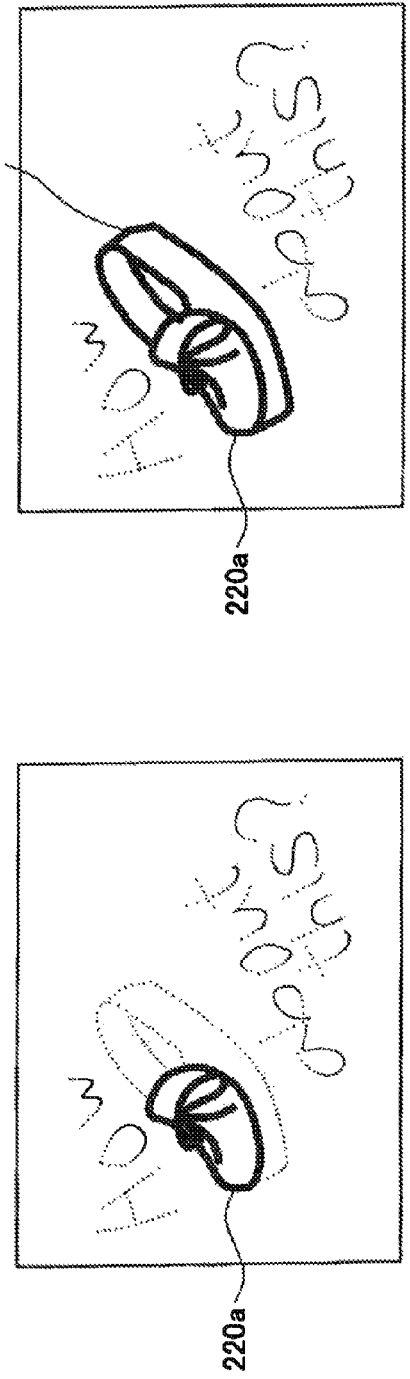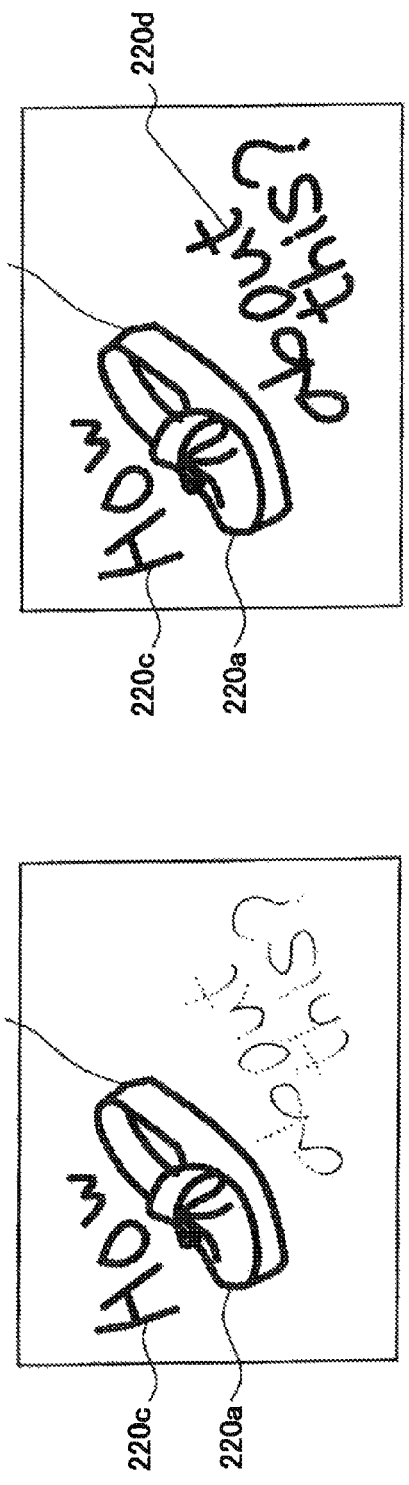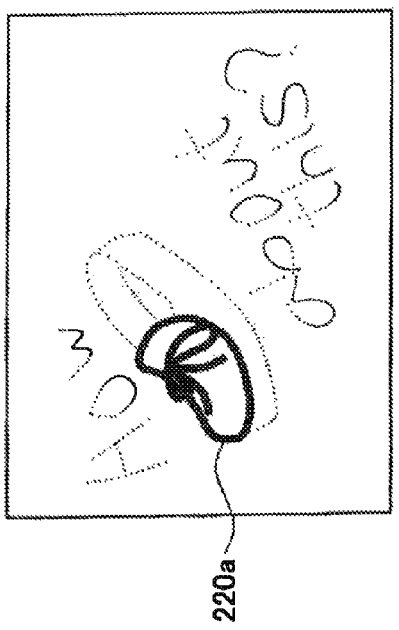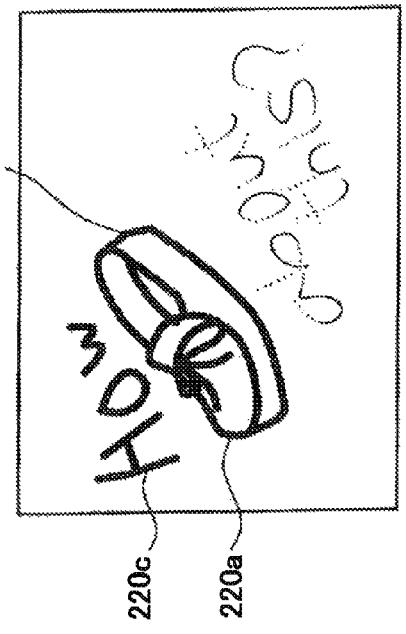
FIG. 13A
FIG. 13B
FIG. 13C
FIG. 13D

INFORMATION PROCESSING APPARATUS, INFORMATION PROCESSING METHOD, AND PROGRAM

CROSS REFERENCE TO PRIOR APPLICATION

This application is a continuation of U.S. patent application Ser. No. 13/156,287 (filed on Jun. 8, 2011), which claims priority to Japanese Patent Application No. 2010-140569 (filed on Jun. 21, 2010), which are all hereby incorporated by reference in their entirety.

BACKGROUND

The present disclosure relates to an information processing apparatus, an information processing method, and a program.

In recent years, there has been rapid development in electronic communication technologies. As examples, it is now common to exchange information via electronic mail and to share information on a BBS (Bulletin Board System) on a Web page. Meanwhile, communication technologies, such as a corkboard and a telephone answering machine, that enable text, image or audio information to be recorded and left at a real location where people gather, such as in the home, to enable other people who subsequently come to such location to share the information have been widely used since olden times.

The communication technologies described above have their respective advantages. For example, a BBS has an advantage in that a log of information is stored in a time series and can be viewed as necessary. A cork board has advantages in that information can be recorded and shared with a high degree of freedom by intuitive operations, such as by displaying important information so as to stand out or adding handwritten text and/or decorations to better express the intention and/or feelings of the person recording the information (hereinafter referred to as the "poster").

New communication technologies that combine the advantages of the communication technologies mentioned above are being developed. As one example, JP2008-263385A discloses a technology relating to an electronic corkboard system where information that has been received via a home network from a mobile telephone is displayed on a display apparatus and read by another mobile telephone.

SUMMARY

However, when information is exchanged using mobile telephones as disclosed in JP2008-263385A, compared to a corkboard for handwritten information for example, there is still lots of room for improvement regarding the intuitiveness of operations and the freedom with which information can be recorded.

The present disclosure was conceived in view of the problems described above and aims to provide a novel and improved information processing apparatus, information processing method, and program that enable a user to record information by an intuitive operation and to share the information with another user.

According to an embodiment of the present disclosure, there is provided an information processing apparatus including an operation unit acquiring an input operation for a message composed of at least one of text and an image, a recording control unit recording the message in accordance with the acquired input operation, and a reproduction control unit reproducing the recorded message to display the message on a display unit.

According to this configuration, it is possible for a user to record a message by making an intuitive operation on an information processing apparatus. The recorded message is reproduced by the information processing apparatus. By having another user view the reproduced message, it is possible to share information between the user who inputted the message and the other user who viewed the reproduced message.

The recording control unit may further record a state of the input operation. The reproduction control unit may process the message in accordance with the state of the input operation to reproduce the message.

The recording control unit may record a duration of the input operation. The reproduction control unit may reproduce animation of the message with a duration in keeping with the duration of the input operation.

The reproduction control unit may reproduce the animation of the message by making the duration of reproduction shorter than a duration of the input operation for an interval in input of the message during the input operation.

The recording control unit may reproduce an entire image of the message and the animation of the message in parallel.

The reproduction control unit may divide the message into a plurality of parts and reproduce the animation of the respective parts in parallel.

The reproduction control unit may be operable when the duration of the input operation exceeds a first threshold, to reproduce the animation of the message by making the duration of reproduction shorter than the duration of the input operation.

The reproduction control unit may be operable when the duration of the input operation exceeds a second threshold, to reproduce the animation of the message by making the duration of reproduction a fixed value regardless of the duration of the input operation.

The reproduction control unit may be operable when the duration of the input operation is shorter than a third threshold, to reproduce the animation of the message by making the duration of reproduction shorter than the duration of the input operation.

The reproduction control unit may be operable when the duration of the input operation exceeds a fourth threshold, to reproduce the animation of the message by making the duration of reproduction longer than the duration of the input operation.

According to another embodiment of the present disclosure, there is provided an information processing method which includes acquiring an input operation for a message composed of at least one of text and an image, recording the message in accordance with the acquired input operation, and reproducing the recorded message to display the message on a display unit.

According to yet another embodiment of the present disclosure, there is provided a program for causing a computer to execute a process acquiring an input operation for a message composed of at least one of text and an image, a process recording the message in accordance with the acquired input operation, and a process reproducing the recorded message to display the message on a display unit.

According to the embodiments of the present disclosure described above, it is possible for a user to record information by an intuitive operation and share the information with another user.

BRIEF DESCRIPTION OF THE DRAWINGS

FIGS. 13A to 13D are diagrams useful in explaining one example of a procedure whereby a handwritten message is reproduced according to a second embodiment of the present disclosure;

DETAILED DESCRIPTION OF THE EMBODIMENTS

Figure 1:
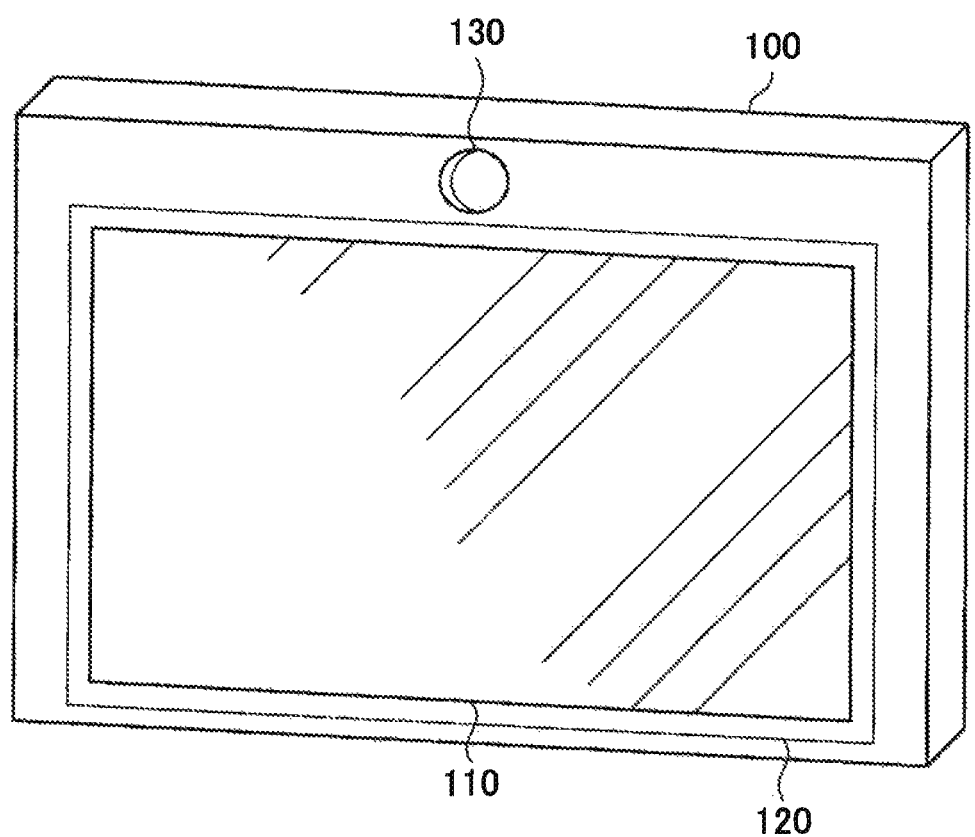
FIG. 1 is a diagram showing the external appearance of an information processing apparatus according to a first embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The following description is given in the order indicated below.

1. First Embodiment 1-1. Apparatus Configuration
1-2. Configuration of Display Screens
1-3. Input Operation for Messages
1-4. Move and Delete Operations for Messages 2. Second Embodiment 3. Third Embodiment 4. Appendix 1. First Embodiment 1-1. Apparatus Configuration First, the configuration of an information processing apparatus according to a first embodiment of the present disclosure will be described with reference to FIGS. 1 and 2.

FIG. 1 is a diagram showing the external appearance of an information processing apparatus 100 according to the first embodiment of the present disclosure. As shown in FIG. 1, the information processing apparatus 100 includes a display unit 110 and an operation unit 120, and is additionally equipped with a camera unit 130 as necessary.

The information processing apparatus 100 is set up in the home, for example, and is used to share information by having members of the family view displayed messages. The location where the information processing apparatus 100 is set up is not limited to inside the home and as other examples may be an office or a school.

As shown in the drawing, the information processing apparatus 100 may be an apparatus in which the display unit 110, the operation unit 120, and the camera unit 130 are integrally provided, or may be configured with the display unit 110, the operation unit 120 and the camera unit 130 as separate devices. The information processing apparatus 100 may be a dedicated apparatus, or may be one of various types of apparatus, such as a digital photo frame, a television set, a personal computer (which may be any of a tablet PC, a notebook PC, or a desktop PC), or a mobile terminal, that is equipped with the display unit 110 and the operation unit 120 and functions as the information processing apparatus 100 due to application software being installed.

The display unit 110 displays messages composed of text and/or images to users. As examples, the display unit 110 may be an LCD (Liquid Crystal Display), a PDP (Plasma Display Panel), or an organic EL (Electro-Luminescence) panel. When the display unit 110 is configured as a separate device to other parts of the information processing apparatus 100, the display unit 110 may be connected by an interface such as HDMI (High-Definition Multimedia Interface).

The operation unit 120 acquires an input operation made by a user for a message composed of text and/or images. As shown in the drawing, the operation unit 120 may be a touch panel provided on the screen of the display unit 110 or may be another input apparatus, such as a tablet, a mouse, or a keyboard. The operation unit 120 may also be a combination of a plurality of input apparatuses.

Here, the message for which the operation unit 120 acquires an input operation may be one of various types of message composed of text and/or images, such as a typed message, a handwritten message, a handwritten event/appointment, a photograph, or a photograph embellishment (note that in this specification, the expression "photograph embellishment" refers to any text or drawing written on a photograph). The text referred to here may be typed or handwritten. The images meanwhile may be photographs or may be illustrations drawn by hand. The input operation for a message by the operation unit 120 may be the addition of arbitrary information to a format provided in advance, for example a schedule, or may be editing of a message that has already been recorded, such as when a photograph embellishment is added to a photograph that was taken by the camera unit 130.

The camera unit 130 acquires an image in accordance with an input operation acquired by the operation unit 120. When the camera unit 130 is configured so as to be separate to other parts of the information processing apparatus 100, the camera unit 130 may be connected by an interface such as USB (Universal Serial Bus) or IEEE 1394.

Figure 2:
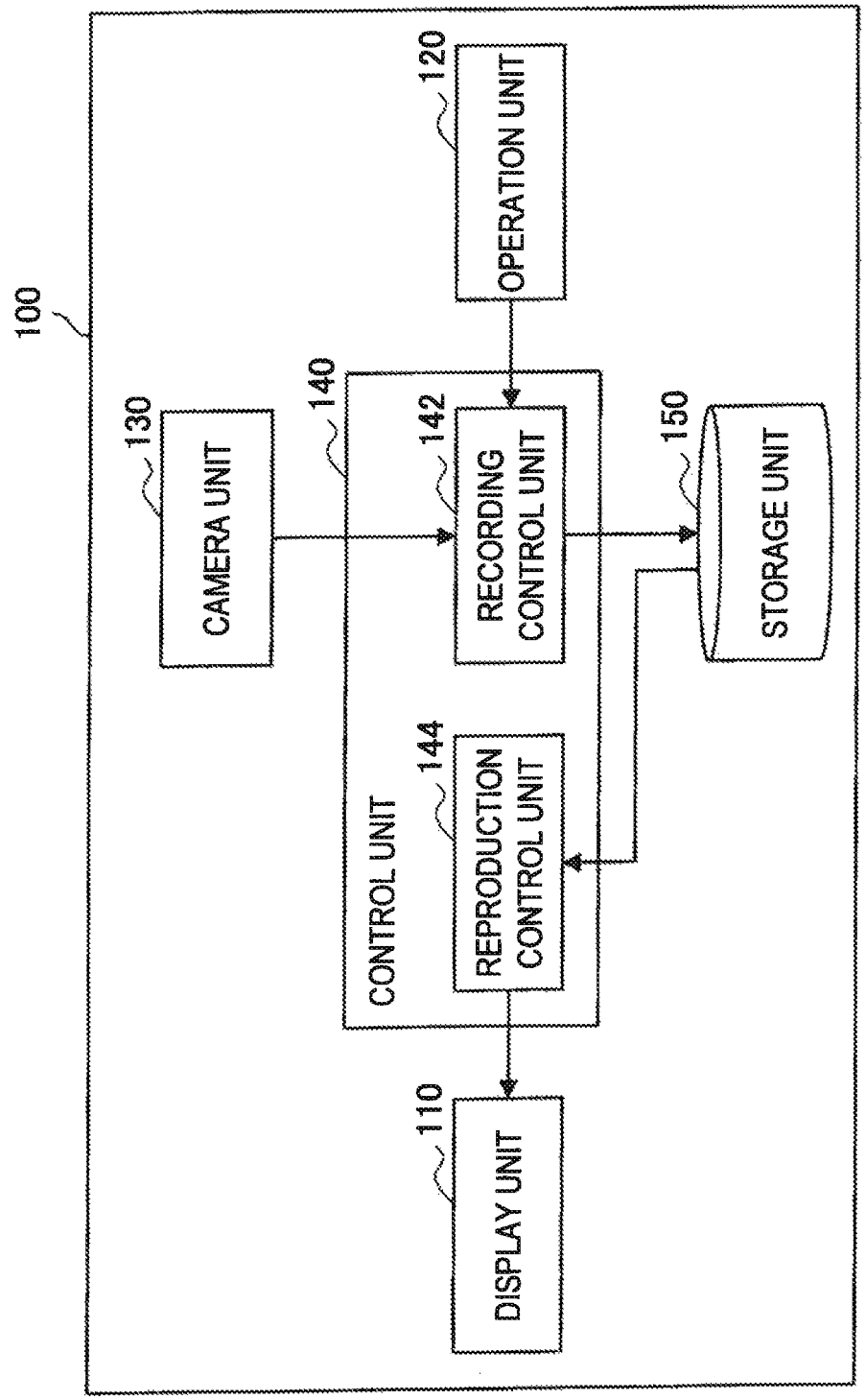
FIG. 2 is a block diagram showing the functional configuration of the information processing apparatus according to the same embodiment.

FIG. 2 is a block diagram showing the functional configuration of the information processing apparatus 100 according to the first embodiment of the present disclosure. As shown in FIG. 2, the information processing apparatus 100 includes the display unit 110, the operation unit 120, a control unit 140, and a storage unit 150, and is additionally equipped with the camera unit 130 as necessary.

The control unit 140 includes a recording control unit 142 that records a message in accordance with an input operation by the user acquired by the operation unit 120 and a reproduction control unit 144 that reproduces recorded messages and displays the messages on the display unit 110. As examples, the control unit 140 may be implemented by a circuit configuration including an integrated circuit or the like, or may be implemented by a CPU (Central Processing Unit) executing a program stored in the storage unit 150.

Data that may be used for processing in the information processing apparatus 100 is stored in the storage unit 150. As one example, messages recorded by the recording control unit 142 are stored in the storage unit 150. Also, when the control unit 140 is implemented by a CPU, a program that is executed by the CPU to cause the CPU to function as the control unit 140 may be stored in the storage unit 150.

1-2. Configuration of Display Screens

Next, the configuration of display screens displayed by the information processing apparatus 100 according to the first embodiment of the present disclosure will be described with reference to FIGS. 3 to 7.

Figure 3:
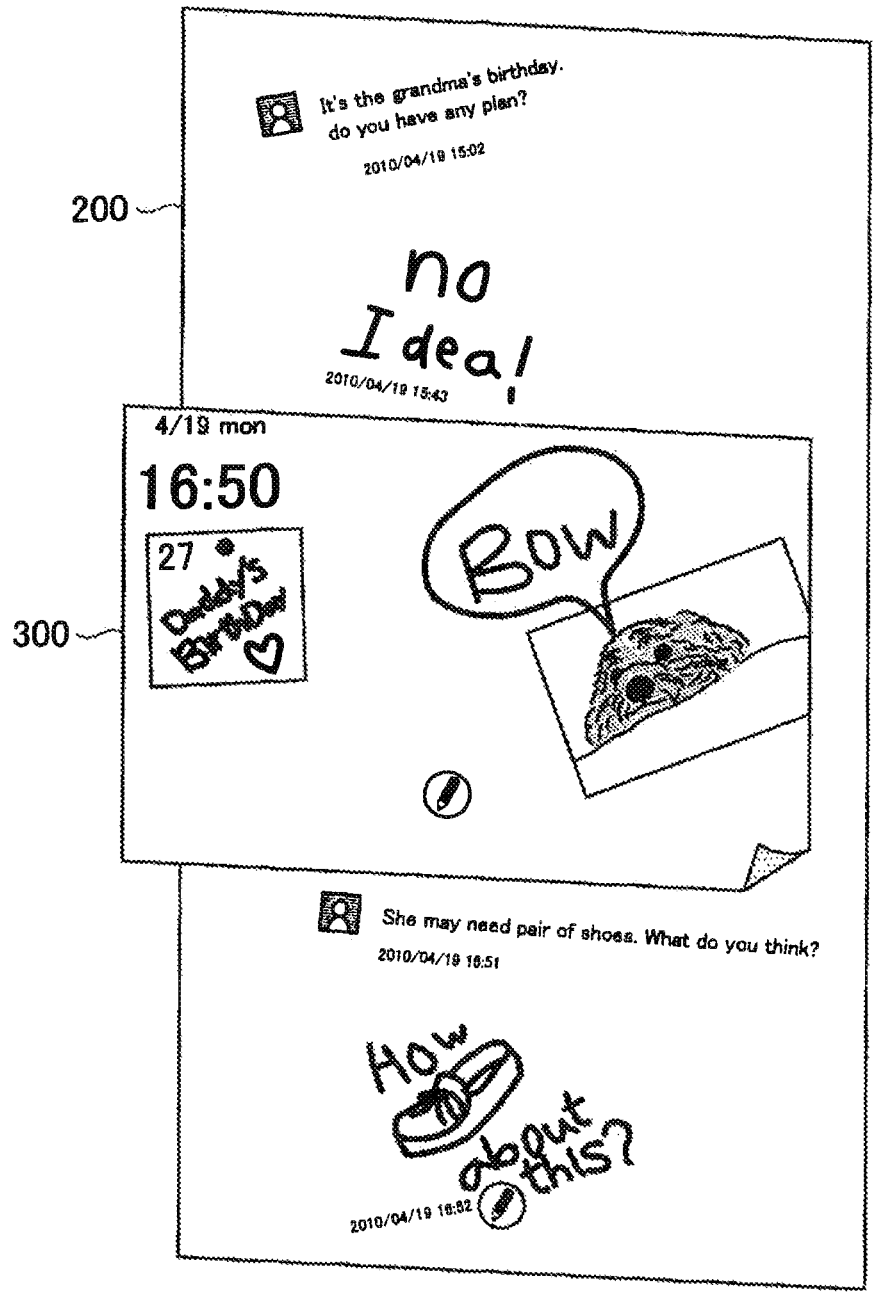
FIG. 3 is a diagram useful in explaining a display screen according to the same embodiment.

FIG. 3 is a diagram useful in explaining a display screen according to the first embodiment of the present disclosure. As shown in FIG. 3, the reproduction control unit 144 of the information processing apparatus 100 displays a first display screen 200 and a second display screen 300 on the display unit 110. As shown in the drawing, the reproduction control unit 144 displays the first display screen 200 and the second display screen 300 in layers on the display unit 110. The reproduction control unit 144 may also display an input panel 400 (not shown) for inputting a message in accordance with a user operation on the display unit 110. The input panel 400 will be described later in this specification.

The first display screen 200 is a display screen in which messages recorded by the recording control unit 142 are displayed in a time series. The first display screen 200 functions as a message roll that displays a historical log of messages that have been recorded, for example. The messages displayed on the first display screen 200 continue to be displayed on the first display screen 200 until the user makes an operation such as moving or deleting the messages or until a specified period has passed.

Here, when a large number of messages are displayed on the first display screen 200 and it is no longer possible to display the messages on the display unit 110, the reproduction control unit 144 scrolls the first display screen 200 in a specified direction. The illustrated first display screen 200 is scrolled in the up-down direction of the screen. When the user has made no particular operation on the operation unit 120, the first display screen 200 that includes the latest message that has been recorded is displayed on the display unit 110. When the user has performed a scroll operation using the operation unit 120, such as a selection operation for the upper part or lower part of the screen or an upward or downward drag operation, the reproduction control unit 144 scrolls the first display screen 200 to display a historical log of older or newer messages. Note that the first display screen 200 and the messages displayed on the first display screen 200 will be described in detail later.

The second display screen 300 is a display screen for displaying messages selected by the user out of the messages recorded by the recording control unit 142. The second display screen 300 functions as a corkboard that displays only certain messages, such as messages that are important to the user or that the user is interested in, at a position that is easy to view. The messages displayed on the second display screen 300 continue to be displayed on the second display screen 300 until the user performs a moving or deleting operation.

Here, the messages displayed on the second display screen 300 may be indirectly added to by the reproduction control unit 144 copying or moving messages displayed on the first display screen 200 onto the second display screen 300 in accordance with a user instruction acquired by the operation unit 120. The messages displayed in the second display screen 300 may also be directly added to by the recording control unit 142 recording a message in accordance with an input operation by the user that has been acquired by the operation unit 120 and has the second display screen 300 as the input destination. When a message is directly added to the second display screen 300, the reproduction control unit 144 may automatically copy the added message to the first display screen 200 as the historical log of messages.

Unlike the first display screen 200, the second display screen 300 may be set so that scrolling is not possible. In addition, when users add messages to the second display screen 300 one after the other and such messages can no longer be displayed on the display unit 110, the recording control unit 142 may be set so as to not accept a message-adding operation by a user for the second display screen 300 so as to urge the user to sort the messages already displayed on the second display screen 300. Note that the second display screen 300 and the messages displayed on the second display screen 300 will be described in detail later.

Figure 4:
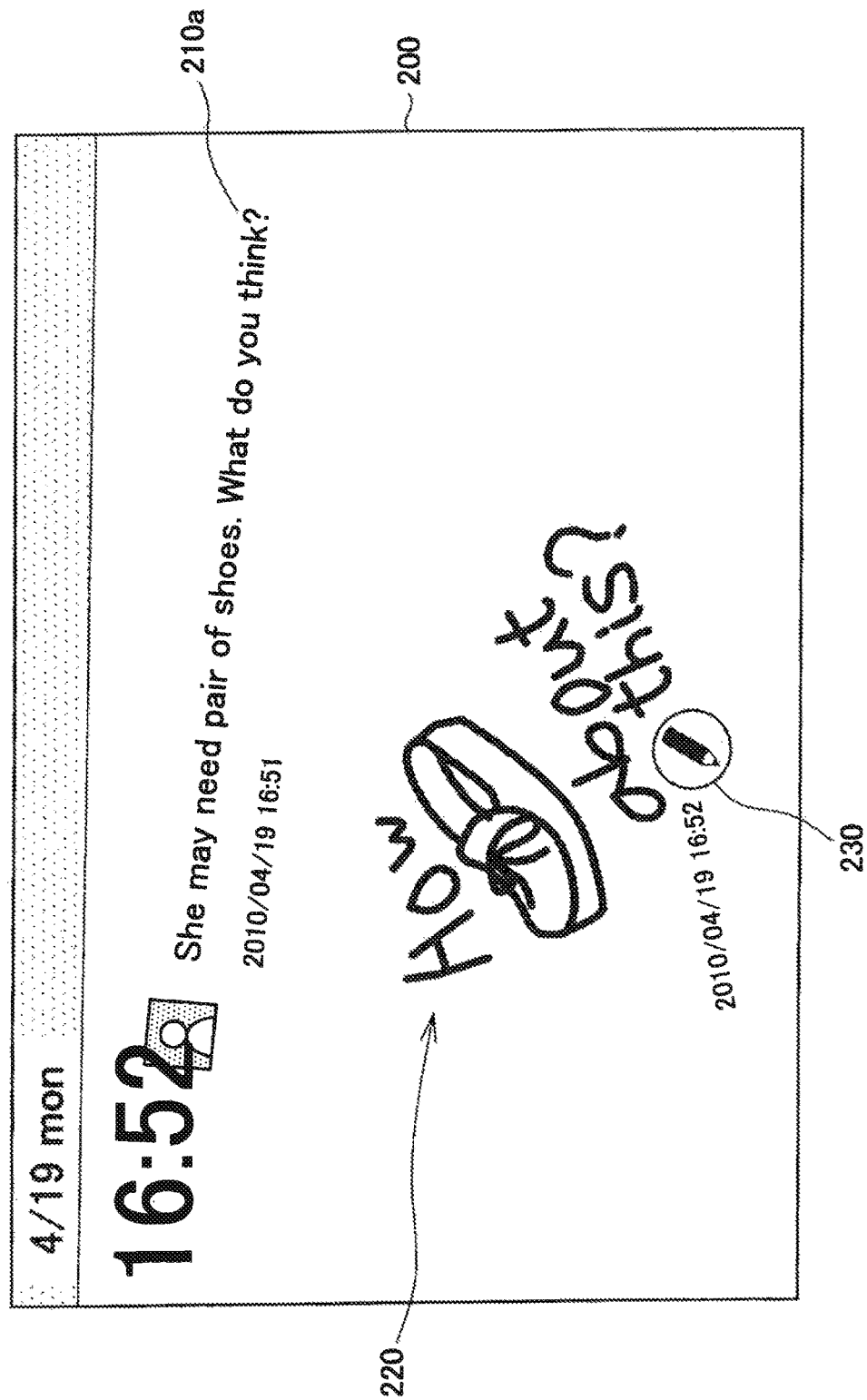
FIG. 4 is a diagram showing one example of a first display screen displayed according to the same embodiment.

FIG. 4 is a diagram showing one example of the first display screen 200 displayed according to the first embodiment of the present disclosure. As shown in FIG. 4, a typed message 210a, a handwritten message 220, and an input button 230 are displayed on the first display screen 200. Aside from such messages, other types of message may be displayed on the first display screen 200, such as handwritten events/appointments and photographs or photograph embellishments. As shown in the drawing, the time/date may also be displayed on the first display screen 200. Note that although the historical log of messages is displayed from the top to the bottom of the screen in the illustrated example, as other examples the direction in which the historical log of messages is displayed may be from the bottom to the top of the screen or may be toward the left or right of the screen in the horizontal direction.

The typed message 210a is a message produced by an input operation using an input apparatus, such as a keyboard, included in the operation unit 120 of the information processing apparatus 100. As shown in the drawing, in addition to the text, the typed message 210a may be accompanied by an icon image indicating the poster of the message. Although the typed message 210a is shown in black and white in the illustrated example, the typed message 210a may be displayed in color using one or a plurality of other colors. As shown in the drawing, the typed message 210a may also be accompanied by time/date information showing when the message was recorded.

The handwritten message 220 is inputted using the input panel 400, described later. The handwritten message 220 includes the handwritten text "How about this?" and an image that is a drawing of a shoe. Although the handwritten message 220 is shown in black and white in the illustrated example, the handwritten message 220 may be displayed in color using one or a plurality of other colors. As shown in the drawing, the handwritten message 220 may also be accompanied by time/date information showing when the message was recorded.

Here, the reproduction control unit 144 may display the typed message 210a, the handwritten message 220, and other messages to be displayed on the first display screen 200 with such messages automatically inclined by specified angles so that at least the previous and next messages are displayed at different angles. In the illustrated example, the typed message 210a is inclined from upper left to lower right and the handwritten message 220 is inclined at a different angle from lower left to upper right, thereby producing a difference in angles between the typed message 210a and the handwritten message 220. By displaying messages in this way, it is easy for the user to distinguish between the individual messages that appear on the screen.

The input button 230 is a button for bringing up the input panel 400. In the input panel 400, it is possible to make an input operation for the handwritten message 220 via a touch panel, tablet, mouse, or the like included in the operation unit 120. Note that the reproduction control unit 144 may hide the input button 230 if the user has not made any particular operation of the operation unit 120 and only display the input button 230 when some kind of operation of the operation unit 120 has been made. As mentioned earlier, the input panel 400 will be described later.

Figure 5:
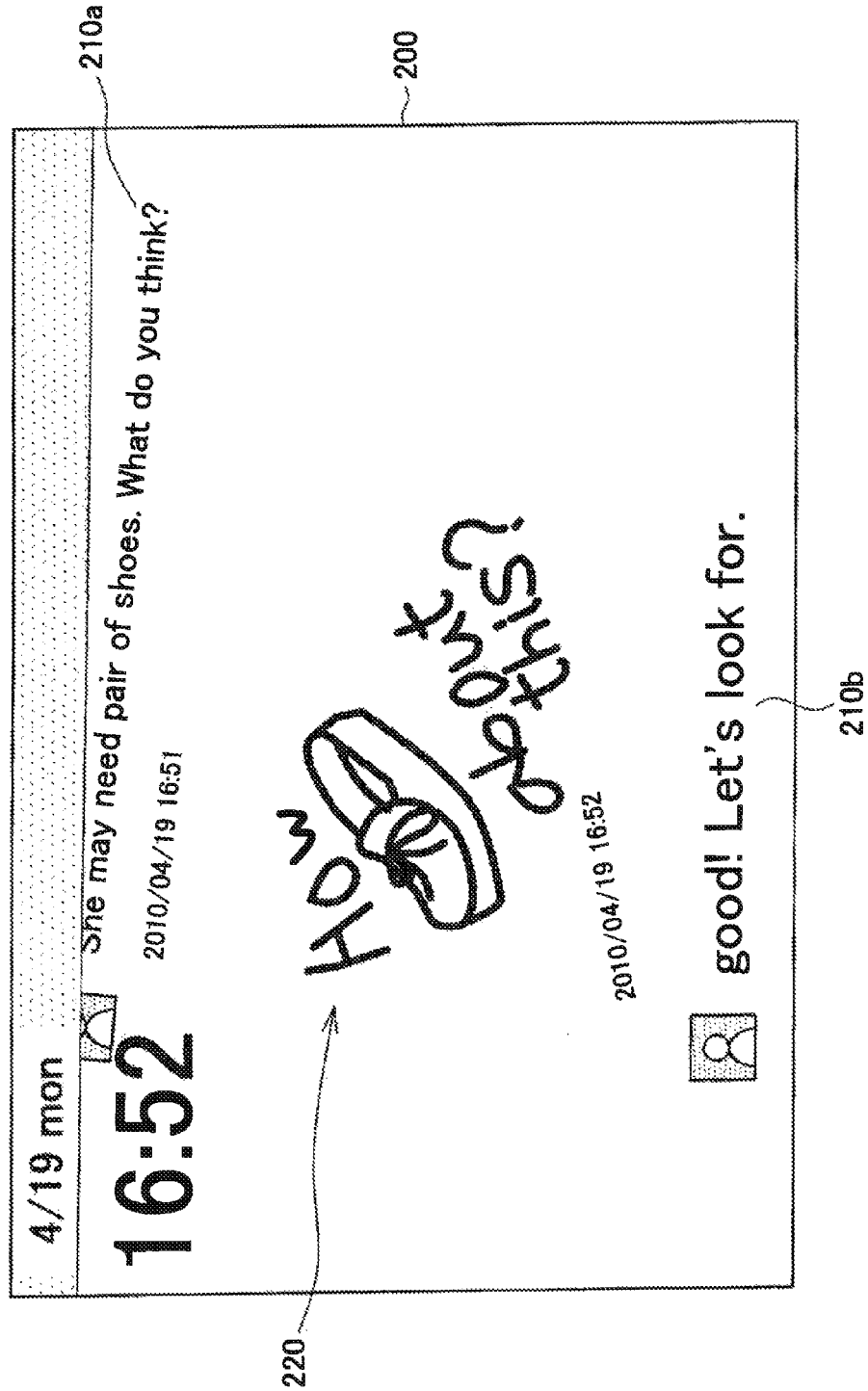
FIG. 5 is a diagram showing another example of the first display screen displayed according to the same embodiment.

FIG. 5 is a diagram showing another example of the first display screen 200 displayed according to the first embodiment of the present disclosure. As shown in FIG. 5, an additional message 210b generated by typing has been added to the first display screen 200. Note that the case where an additional message generated by handwriting is added will be described later.

The additional message 210b is a message that is currently being generated by an input operation by the user using an input apparatus, such as a keyboard, included in the operation unit 120 of the information processing apparatus 100. As shown in the drawing, aside from text, the additional message 210b may be accompanied by an icon image indicating the poster of the message. Although the additional message 210b is shown in black and white in the illustrated example, the additional message 210b may be displayed in color using one or a plurality of other colors. By carrying out a specified operation after the input operation, the user can have the additional message 210b included in the historical log of messages displayed on the first display screen 200.

Here, the reproduction control unit 144 displays the additional message 210b at the bottom of the first display screen 200. The reproduction control unit 144 also scrolls the typed message 210a and the handwritten message 220 that were already being displayed in the direction of the oldest message on the display (i.e., the typed message 210) by a distance corresponding to the display area of the additional message 210b at the bottom of the first display screen 200. Also, when displaying the additional message 210b, the reproduction control unit 144 may hide the input button 230 that is overlapped by the additional message 210b.

Figure 6:
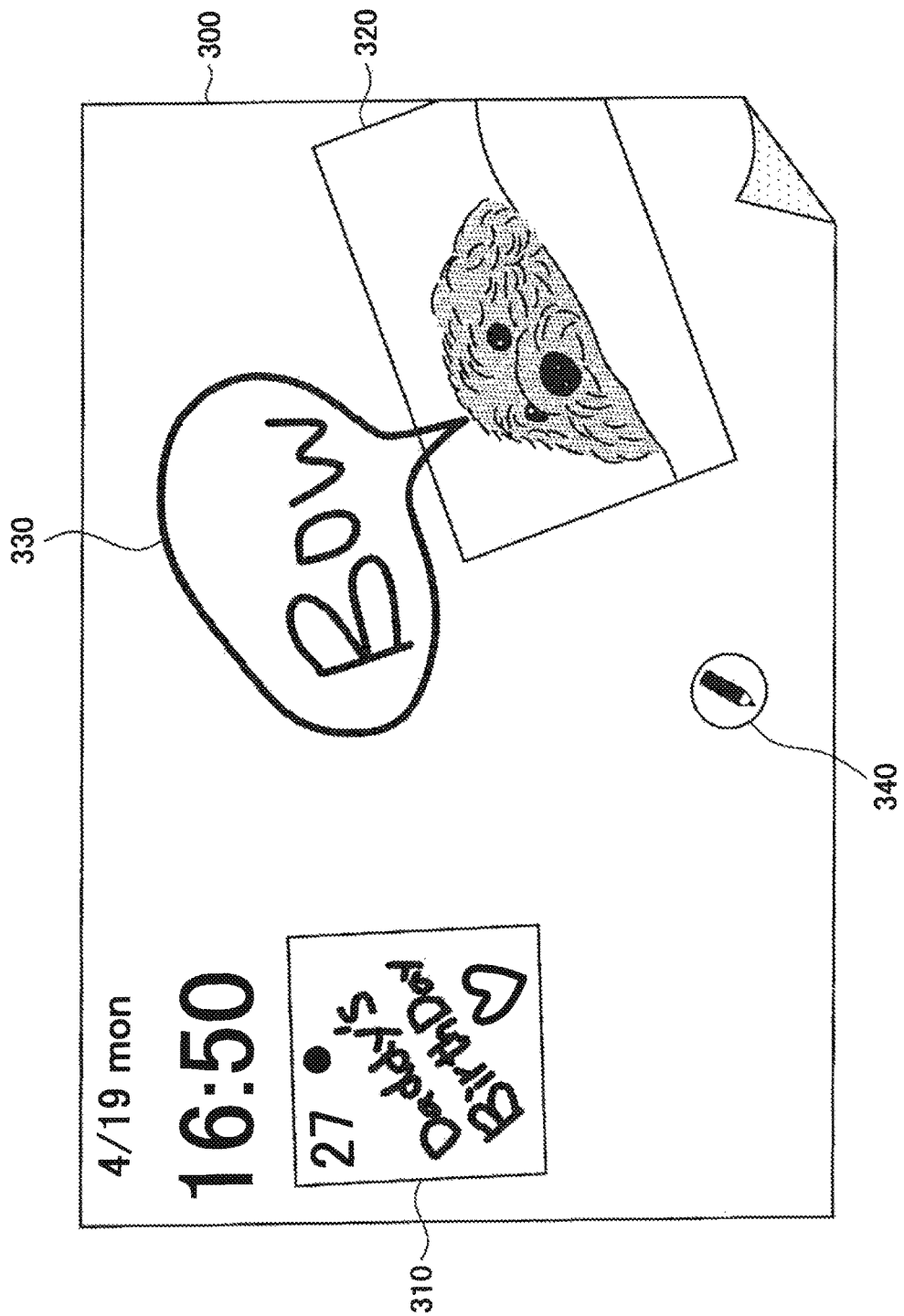
FIG. 6 is a diagram showing one example of a second display screen displayed according to the same embodiment.

FIG. 6 is a diagram showing one example of a second display screen 300 displayed according to the first embodiment of the present disclosure. As shown in FIG. 6, a handwritten event/appointment 310, a photograph 320, a photograph embellishment 330, and an input button 340 are displayed on the second display screen 300. Aside from such messages, other types of message, such as a typed message or a handwritten message, may also be displayed on the second display screen 300. As shown in the drawing, the time/date may also be displayed on the second display screen 300.

The handwritten event/appointment 310 is inputted using the input panel 400, described later. In the illustrated example, the handwritten event/appointment 310 is inputted by the user inputting the "Daddy's Birthday" part as handwriting, with the format of the date/time part being provided in advance. The second display screen 300 can be used to display a message, like the handwritten event/appointment 310 for example, that is important to the user at a prominent place to prevent such message from being forgotten.

When the information processing apparatus 100 includes the camera unit 130, the photograph 320 is an image acquired by such camera unit 130. Note that the recording of an image using the camera unit 130 will be described later. The photograph embellishment 330 is inputted using the input panel 400, which is also described later. In the illustrated example, the photograph 320 is first recorded using the camera unit 130 and then the user makes an input operation on the operation unit 120 to input the photograph embellishment 330 using the input panel 400, resulting in the photograph embellishment 330 being recorded for the photograph 320. The second display screen 300 may be used to display messages, like the photograph 320 and the photograph embellishment 330 for example, that are of interest to the user at a prominent place to enable users to frequently enjoy such messages.

The input button 340 is a button for bringing up the input panel 400. Via the input panel 400, it is possible to make an input operation for a handwritten message or the like by operating a touch panel, tablet, mouse, or the like included in the operation unit 120. The reproduction control unit 144 may hide the input button 340 if the user has not made any particular operation of the operation unit 120, and display the input button 340 when the user has made some kind of operation of the operation unit 120. Note that the input panel 400 will be described later.

Figure 7:
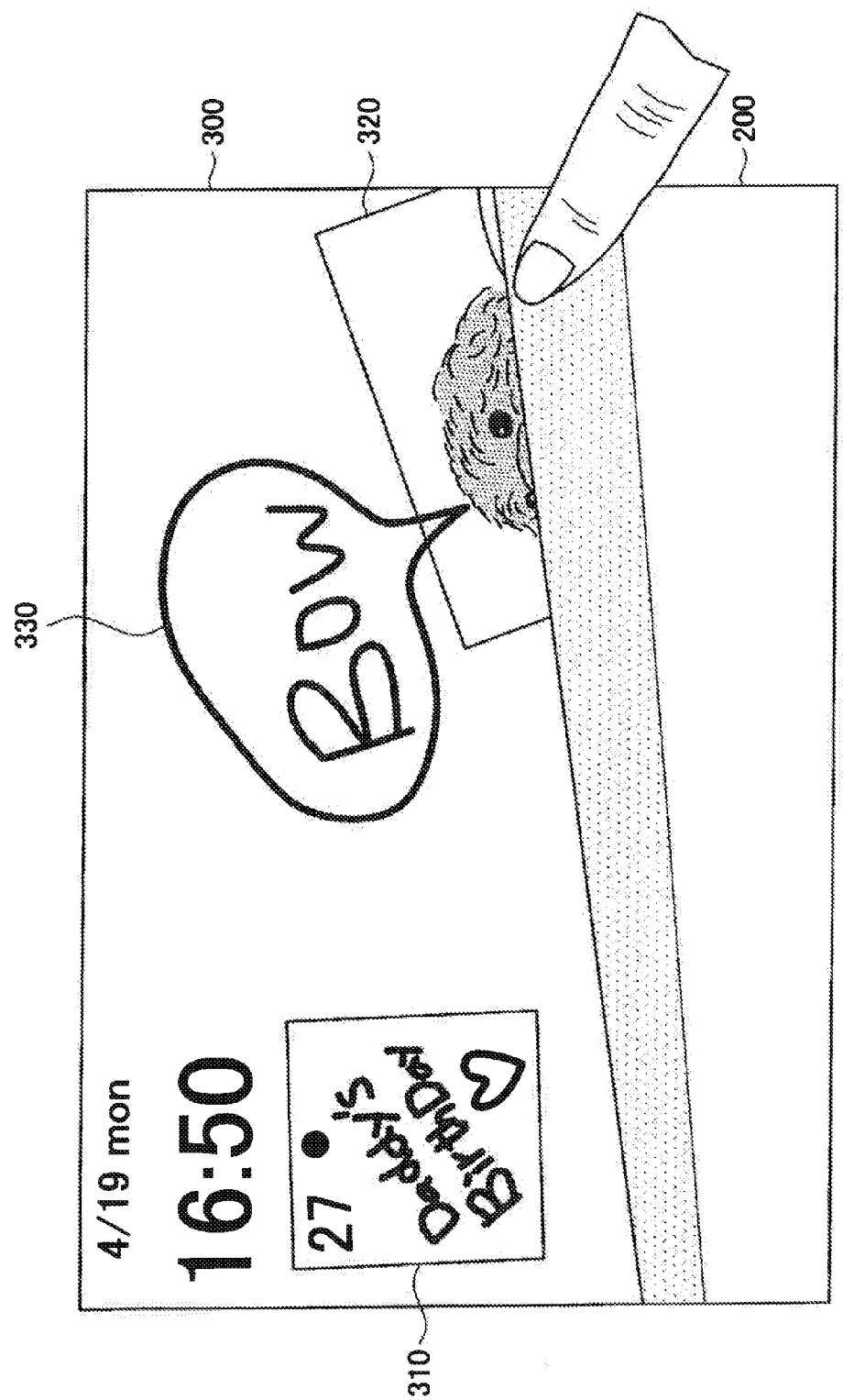
FIG. 7 is a diagram useful in explaining changes in the display proportions of the first display screen and the second display screen displayed according to the same embodiment.

FIG. 7 is a diagram useful in explaining changes in the display proportions of the first display screen 200 and the second display screen 300 displayed according to the first embodiment of the present disclosure. As shown in FIG. 7, the second display screen 300 is displayed in the upper part of the screen and the first display screen 200 is displayed in the lower part.

Here, the display proportions of the first display screen 200 and the second display screen 300 on the display unit 110 are determined in accordance with a user operation acquired by the operation unit 120. For example, as shown in the drawing, when a touch panel that is the operation unit 120 has acquired a touch operation by the user on an arbitrary point on the screen, the reproduction control unit 144 may display the second display screen 300 above the touched point and the first display screen 200 below the touched point. As another example, when a touch panel that is the operation unit 120 has acquired an upward drag operation by the user from the bottom of the screen in a state where only the second display screen 300 is being displayed on the display unit 110 as shown in FIG. 6, the reproduction control unit 144 may display the first display screen 200 with a height and position in the up-down direction determined by the drag operation. When doing so, a visual effect where the second display screen 300 that is displayed on top of the first display screen 200 is peeled off to reveal the first display screen 200 in the peeled-off part may be displayed.

As one example, with a communication technology such as a BBS, although it is easy to grasp the order in which information has been exchanged, it is difficult to keep important information at a prominent place. Meanwhile, with a communication technology such as a corkboard, although it is easy to keep important information at a prominent place, it is difficult to grasp the order in which information has been exchanged.

The configuration of the display screen according to the first embodiment of the present disclosure described above solves these problems. According to the present embodiment, by using a configuration where the reproduction control unit 144 reproduces messages in the first display screen 200 and the second display screen 300, it is possible to display a historical log of messages in a time series and simultaneously display important messages picked up from such messages in a prominent place, which means that the user can grasp the order in which information has been exchanged and also refer at any time to important messages.

In addition, by using a configuration where the reproduction control unit 144 displays the second display screen 300 on top of the first display screen 200 on the display unit 110, it is possible to display two display screens by making effective use of the display area of the display unit 110. Also, by displaying important messages in front of the display of the historical log of messages, it is possible for the user to intuitively grasp the relationships between individual messages.

Also, by using a configuration where the reproduction control unit 144 changes the display proportions of the first display screen 200 and the second display screen 300 displayed in layers in accordance with a user operation, such as indicating an arbitrary point on a touch panel, acquired by the operation unit 120, it is possible for the user to easily change the display proportions of the first display screen 200 and the second display screen 300 via an intuitive operation, and to alternately refer to the historical log of messages and the important messages as necessary.

Also, by using a configuration where the messages are moved between the first display screen 200 and the second display screen 300 in accordance with a user operation acquired by the operation unit 120, it is possible for the user to refer to the two display screens described above continuously via an intuitive operation.

By using a configuration where the reproduction control unit 144 is operable when a message is added to the second display screen 300 to automatically copy such added message to the first display screen 200, it is possible to maintain the consistency of the historical log of messages in the first display screen 200 while maintaining the convenience whereby messages can be directly added to the second display screen 300.

By using a configuration where the reproduction control unit 144 displays messages displayed on the first display screen 200 so as to be inclined by specified angles so that at least the previous and next messages are displayed at different angles, it is possible for the user to easily distinguish between the respective messages. It is also possible to change the display of the historical log of messages, which can prevent such display from looking old and monotonous to the user.

1-3. Input Operation for Messages

Next, an input operation for messages according to the first embodiment of the present disclosure will be described with reference to FIGS. 8 to 10.

Figure 8:
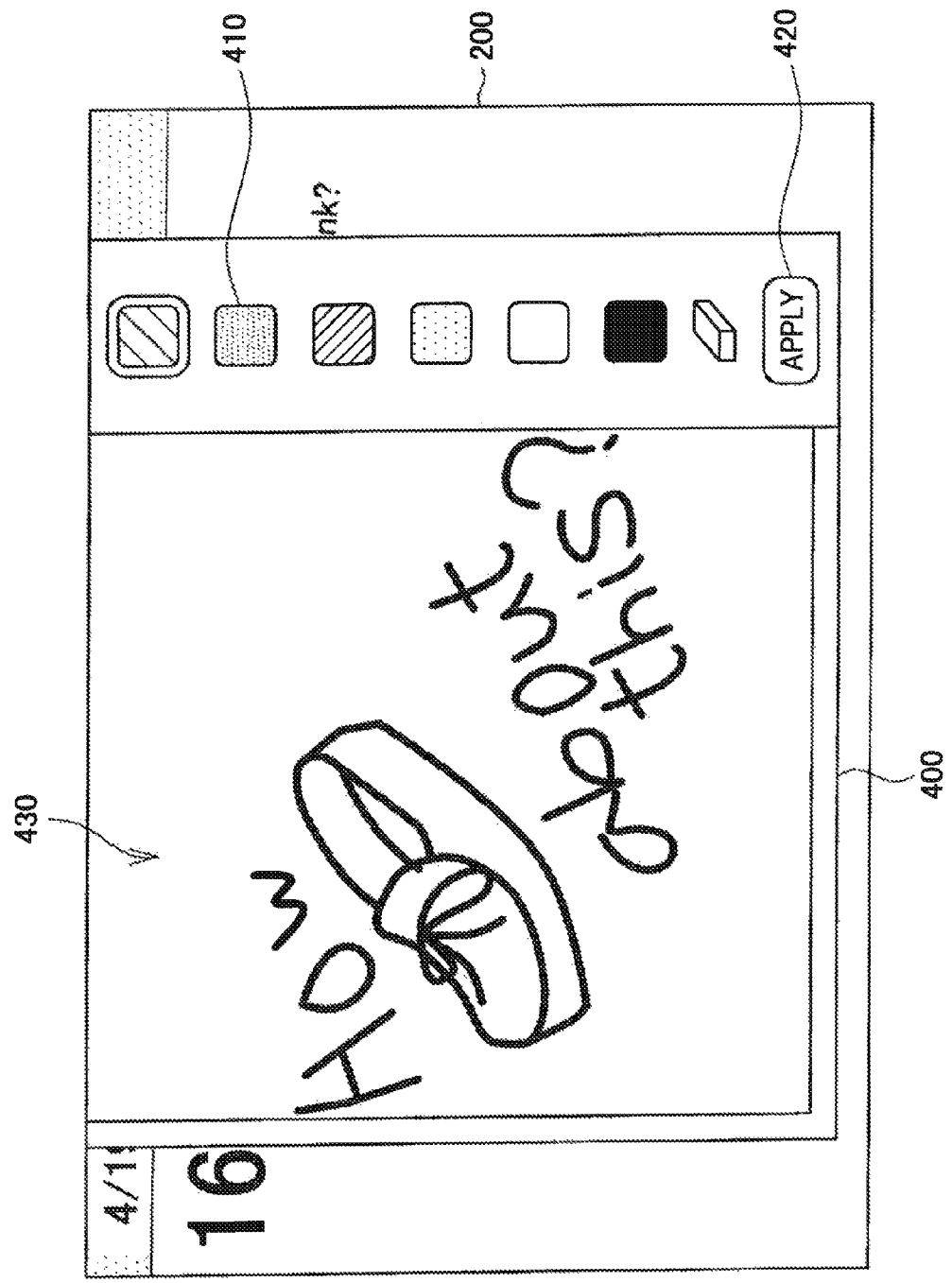
FIG. 8 is a diagram showing one example of a screen for generating handwritten messages using an input panel that is displayed according to the same embodiment.

FIG. 8 is a diagram showing one example of a screen for generating handwritten messages using the input panel 400 that is displayed according to the first embodiment of the present disclosure. As shown in FIG. 8, the input panel 400 includes a palette 410, a recording execution button 420 and an input region 430.

The input panel 400 is displayed by the reproduction control unit 144 on the display unit 110 to acquire an input operation for a handwritten message by the user made via a touch panel or a pointing device such as a tablet or a mouse included in the operation unit 120 of the information processing apparatus 100. The input panel 400 is displayed by a specified operation by the user acquired by the operation unit 120. As one example, such "specified operation" may be pressing the input button 230 displayed on the first display screen 200 or pressing the input button 340 displayed in the second display screen 300. The specified operation may alternatively be any other operation such as pressing a specified key of a keyboard or a double tap on the screen which is detected by a touch panel.

With the input panel 400 described above, the user first selects a color for the input using the palette 410. As one example, aside from a plurality of colors, an eraser for erasing lines may be provided on the palette 410. The user next inputs a message in the input region 430. The lines traced by such input are recorded as a message by the recording control unit 142. The user next presses the recording execution button 420 and the inputted message is recorded to be displayed in the first display screen 200 or the second display screen 300. The display screen in which the inputted message is displayed is the first display screen 200 when the input panel 400 was displayed due to the input button 230 being pressed and is the second display screen 300 when the input panel 400 was displayed due to the input button 340 being pressed. Note that by selecting a region aside from the input panel 400, that is, a region of the first display screen 200 or the second display screen 300, it is possible to close the input panel 400. When doing so, the content inputted by the user into the input region 430 may be stored until the next time the input panel 400 is displayed, or such content may be deleted.

Here, the reproduction control unit 144 may acquire the speed of input by the user via the operation unit 120 and change the thickness of an inputted line displayed in the input region 430 in accordance with the input speed. In this case, a line that has been slowly inputted by the user is thickly displayed and a line that has been quickly inputted by the user is thinly displayed. Also, when the operation unit 120 is a touch panel or a tablet for example and is capable of acquiring the magnitude of the applied pressure when the user makes an input, the reproduction control unit 144 may change the thickness of an inputted line displayed in the input region 430 in accordance with the magnitude of the applied pressure. In this case, a line inputted by the user with a strong press is thickly displayed and a line inputted by the user with a weak press is thinly displayed.

As shown in the drawing, the reproduction control unit 144 may display the input panel 400 with a smaller size than a display screen displayed in the background so that a certain amount of the display content of the first display screen 200 or the second display screen 300 displayed in the background can be seen. The reproduction control unit 144 may also display the input panel 400 with a specified transparency. In such case, it is possible to make an input operation on the input panel 400 while visually referring to some extent to the messages displayed in the display screen displayed in the background. As one example, when inputting a message in response to another message, it is possible for the user to generate a reply message while confirming the original message.

Figure 9:
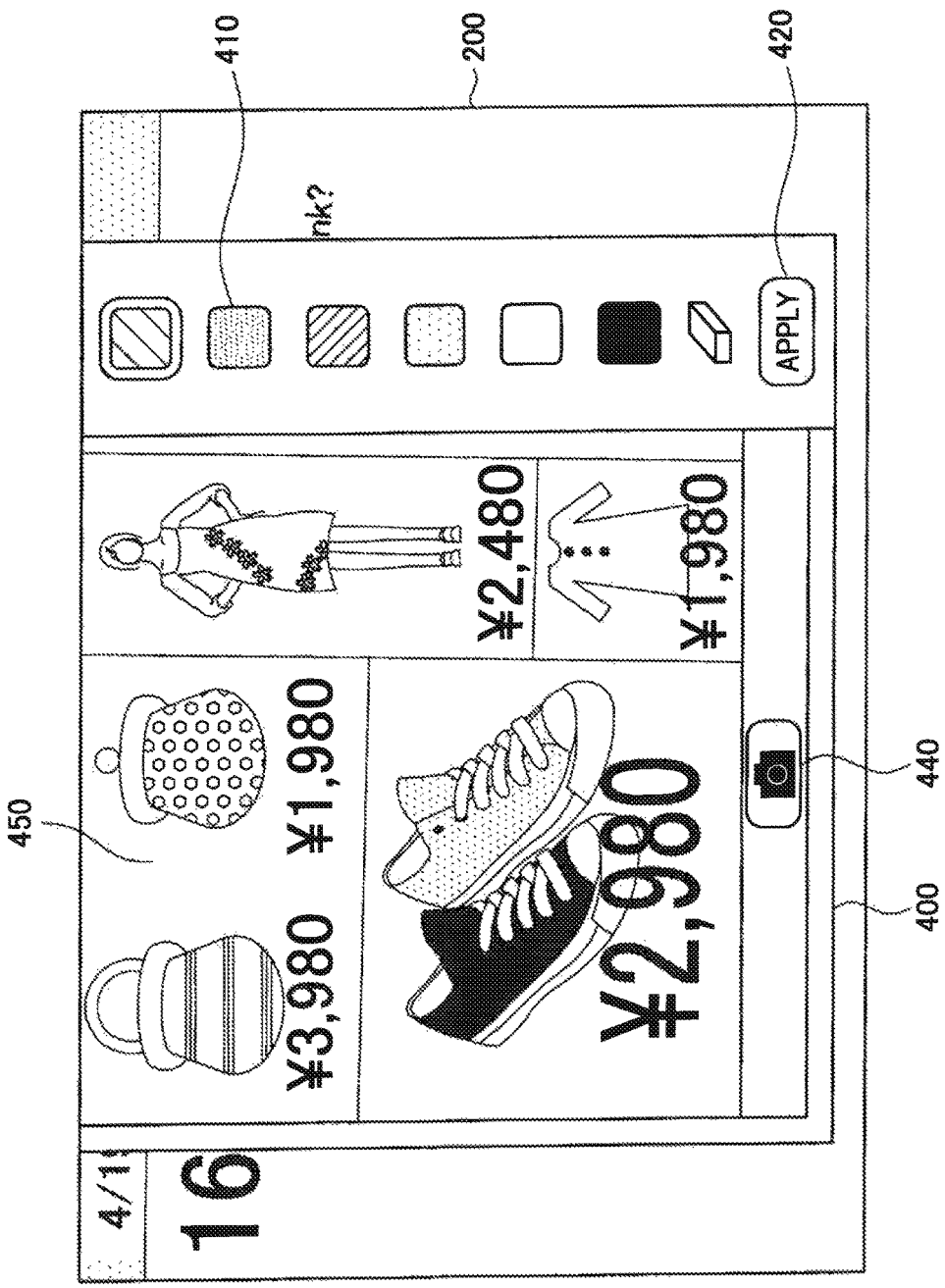
FIG. 9 is a diagram showing one example of an image pickup screen for a photograph using a camera unit realized by the input panel displayed according to the same embodiment.

FIG. 9 is a diagram showing one example of an image pickup screen for a photograph using the camera unit 130 realized by the input panel 400 displayed according to the first embodiment of the present disclosure. As shown in FIG. 9, an image pickup button 440 and an image 450 are displayed on the input panel 400.

The image pickup button 440 is a button for causing the camera unit 130 to take a photograph. The photograph taken by the camera unit 130 is sent to the recording control unit 142 as image data, with the recording control unit 142 recording such image data as a message. Aside from when the image pickup button 440 is pressed, the camera unit 130 may take a photograph when another specified operation, such as pressing a specified key of a keyboard or a double tap on the screen detected by a touch panel, has been made.

The image 450 is image data acquired by the camera unit 130. Aside from when a photograph is being taken and sent to the recording control unit 142, when standing by to take a photograph, the camera unit 130 may pick up images of subjects in view as video data and provide such video data to the reproduction control unit 144 so that the video data is displayed as the image 450. Also, when a photograph has been taken by the camera unit 130, the image data of the photograph may be sent to the reproduction control unit 144 and displayed as the image 450 for a specified period or until an instruction is received from the user.

Note that in the illustrated example, the user is pointing the camera at an advertisement for a store. In this way, by recording a message using the camera unit 130, it is possible to load printed information as it is as a message.

Figure 10:
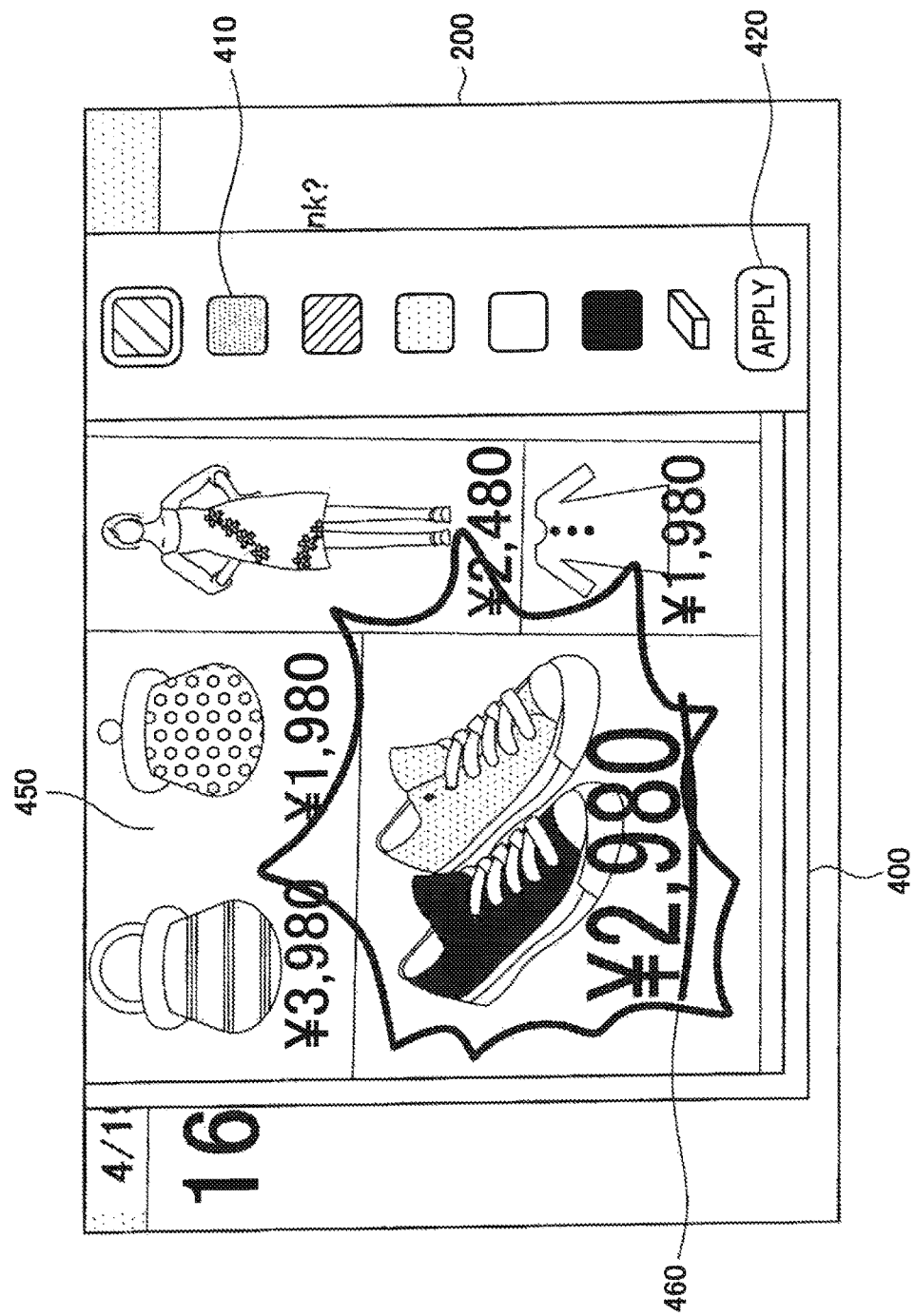
FIG. 10 is a diagram showing one example of an embellishment screen for a photograph using the input panel displayed according to the same embodiment.

FIG. 10 is a diagram showing one example of an embellishment screen for a photograph using the input panel 400 displayed according to the first embodiment of the present disclosure. As shown in FIG. 10, a photograph embellishment 460 is recorded for the image 450.

In the same way as the handwritten message described earlier, the photograph embellishment 460 is inputted by a touch panel or a pointing device such as a tablet or a mouse included in the operation unit 120 of the information processing apparatus 100. Here, after a photograph has been taken using the camera unit 130, it is possible to enable the photograph embellishment 460 to be inputted with the taken photograph still on display as the image 450.

Note that in the illustrated example, the photograph embellishment 460 that indicates a product that the user is interested in is inputted for the image 450 that is a photograph of an advertisement for a store. As shown in this example, by adding a drawing to a photograph taken using the camera unit 130, it is possible to add "plus alpha" information to a photograph and record the result as a message.

With electronic communication technologies, it is difficult to enable the posters of information to express their intentions and/or feelings by way of intuitive operations, such as by adding handwritten text or decorations. An input operation for a message according to the first embodiment of the present disclosure described above solves this problem. According to an input operation made via a touch panel or a pointing device using the input panel 400 displayed by the reproduction control unit 144, handwritten text and/or decorations is/are recorded by an operation that is intuitive to the user. Accordingly, it is possible for the user to easily add an expression of the user's intention and/or feelings to a message to be recorded.

In addition, by using a configuration where the reproduction control unit 144 changes the thickness of an inputted line on display in accordance with the speed of input or the magnitude of applied pressure, it is possible to change the inputted line in accordance with an operation that is intuitive to the user and thereby give users greater freedom to express their intentions and/or feelings when recording messages.

1-4. Move and Delete Operations for Messages

Next, move and delete operations for messages according to the first embodiment of the present disclosure will be described with reference to FIGS. 11 and 12.

Figure 11:
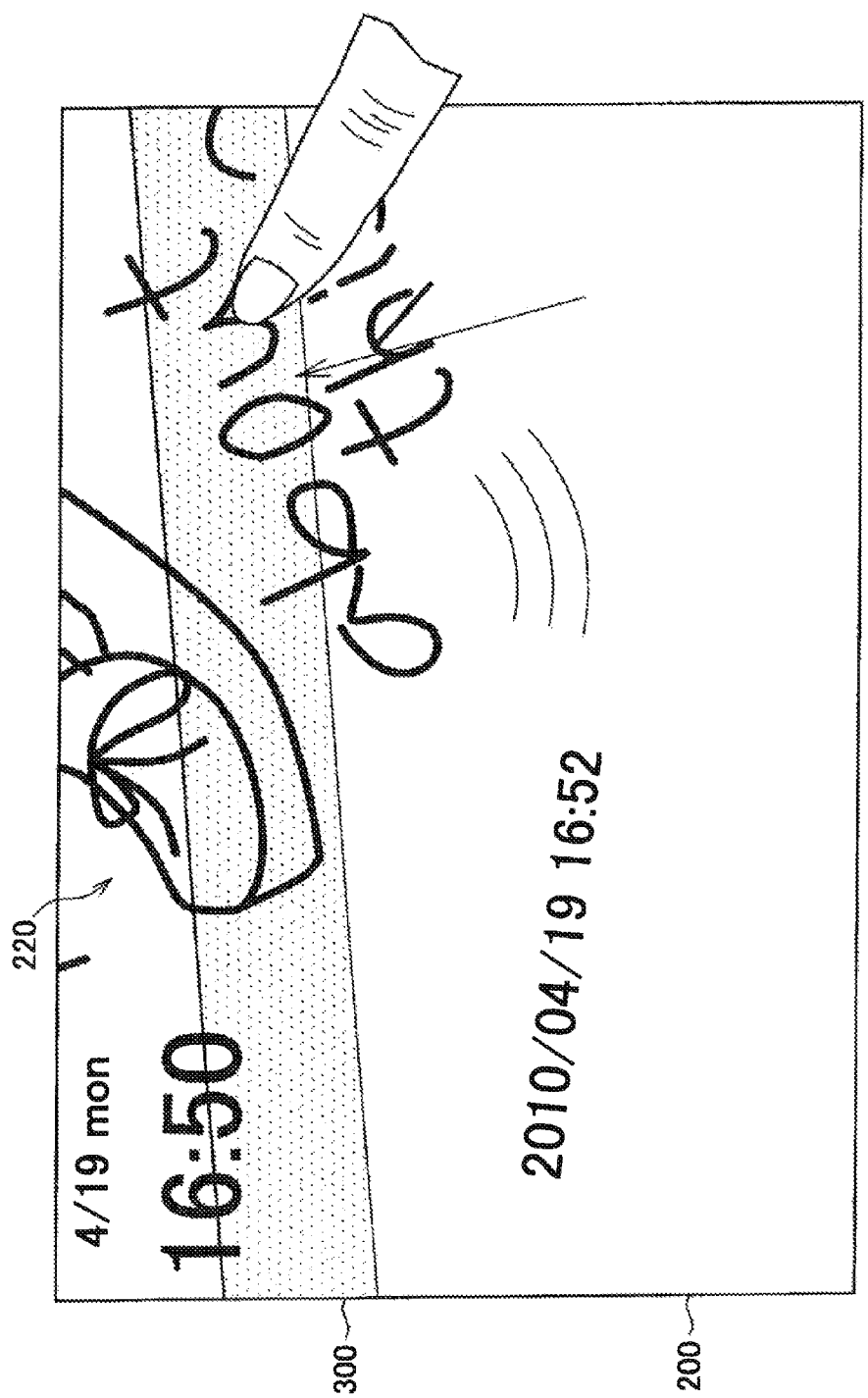
FIG. 11 is a diagram useful in explaining a move operation for a message according to the same embodiment.

FIG. 11 is a diagram useful in explaining a move operation for a message according to the first embodiment of the present disclosure. As shown in FIG. 11, the handwritten message 220 is moved from the first display screen 200 to the second display screen 300 in accordance with a drag operation by the user on the touch panel that is the operation unit 120 of the information processing apparatus 100.

Here, to show that the handwritten message 220 is being moved, the handwritten message 220 may be displayed with a slightly larger display size than the normal display size for the first display screen 200 or the second display screen 300. To show that the handwritten message 220 is being moved, the handwritten message 220 may also be displayed with a visual effect that makes the handwritten message 220 appear to be floating in front of the screen. Although the handwritten message 220 is moved in accordance with a drag operation by the user on the touch panel as shown in the drawing, instead of stopping the movement immediately when the drag operation ends, the handwritten message 220 may be displayed so as to stop by decelerating gradually. If the handwritten message 220 reaches the edge of the first display screen 200 or the second display screen 300 while gradually decelerating, a visual effect where the handwritten message 220 changes direction so as to move in the opposite direction may be displayed.

The handwritten message 220 may be moved between display screens from the first display screen 200 to the second display screen 300 or in the opposite direction, or moved within the first display screen 200 or within the second display screen 300. When the handwritten message 220 is moved, the reproduction control unit 144 may also change the angle by which the handwritten message 220 is inclined before and after the move. The angle of inclination after movement may be decided according to the position at which the handwritten message 220 is displayed after movement and the direction of movement of the handwritten message 220.

Note that although the case where the handwritten message 220 is moved has been described above, it is possible to move every type of message displayed on the first display screen 200 and the second display screen 300, such as the typed message 210, the handwritten event/appointment 310, the photograph 320, or the photo embellishment 330, in the same way as described above. Although all of such items can fundamentally be moved to a freely chosen position, in the first display screen 200, to maintain consistency for the historical log, movement that changes the order of messages may be restricted so that as one example for the case where messages are recorded from the top to the bottom, it is not possible to move a lower message upward so as to pass the immediately preceding message.

Also, although the case where a message is moved in accordance with a drag operation by the user on a touch panel that is the operation unit 120 has been described above, as other examples it is also possible to move a message in the same way as described above by a drag operation by a pointing device, such as a tablet or a mouse, or an operation such as pressing direction keys of a keyboard.

Figure 12:
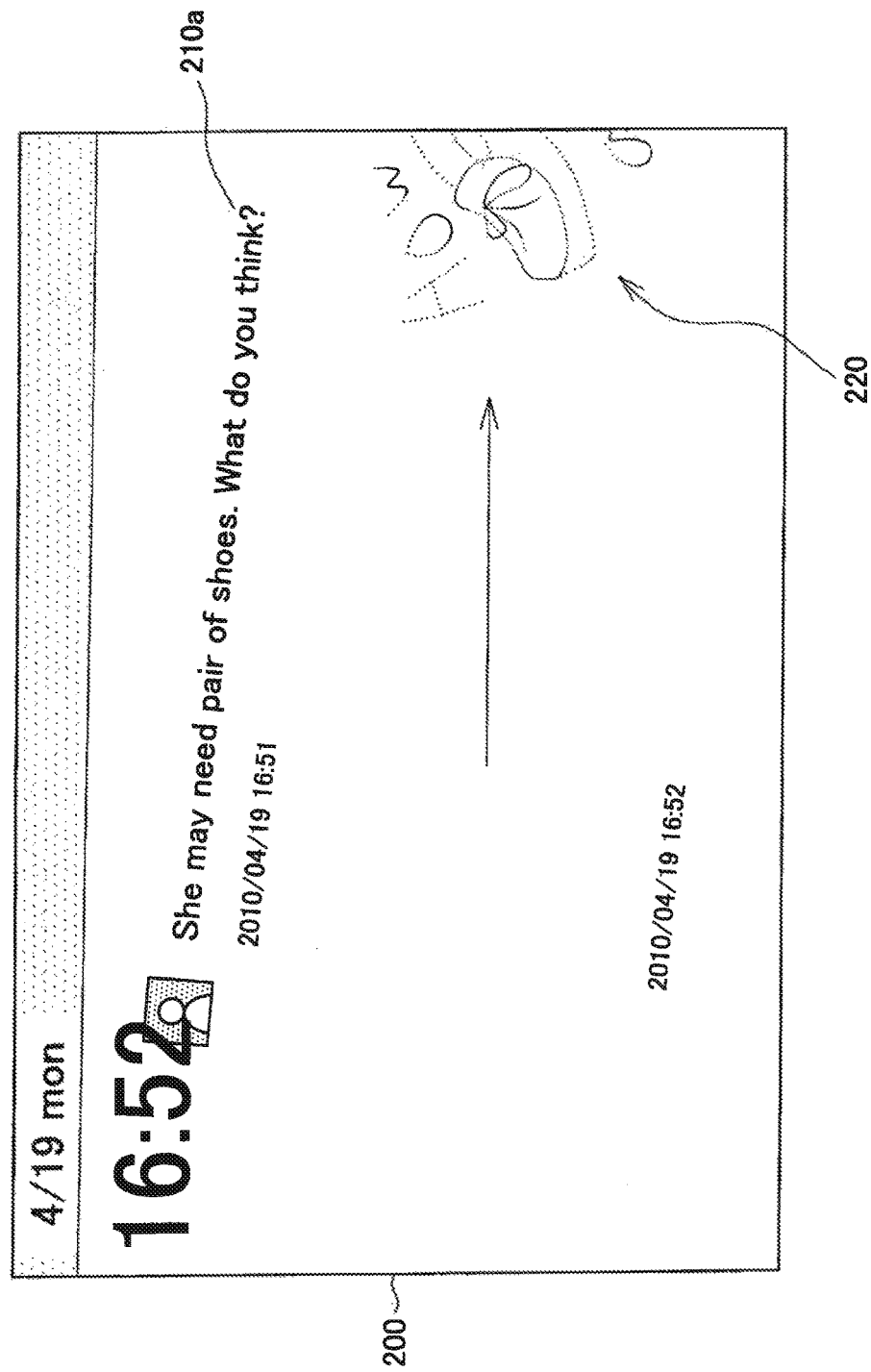
FIG. 12 is a diagram useful in explaining a delete operation for a message according to the same embodiment.

FIG. 12 is a diagram useful in explaining a delete operation for a message according to the first embodiment of the present disclosure. As shown in FIG. 12, the handwritten message 220 is deleted from the first display screen 200 in accordance with a drag operation by the user on a touch panel that constructs the operation unit 120 of the information processing apparatus 100.

Here, the handwritten message 220 is moved to a part that corresponds to an edge of the display unit 110 by a drag operation by the user and is deleted by ending the drag operation at such position. To show that the handwritten message 220 is to be deleted, the handwritten message 220 may be displayed by making the display colors fainter or translucent. Also, to show that the handwritten message 220 is to be deleted, the handwritten message 220 may be displayed with a visual effect where the handwritten message 220 moves so as to be pulled off the screen of the display unit 110. When a drag operation by the user ends at a part corresponding to the edge of the display unit 110, the handwritten message 220 may be deleted immediately. Alternatively, when a drag operation by the user ends at a part corresponding to the edge of the display unit 110, the handwritten message 220 may be displayed on the first display screen 200 with a smaller size than previously or may be displayed only in part and then deleted when the user performs a separate operation or when a specified period has passed.

Note that although the case where the handwritten message 220 displayed on the first display screen 200 is deleted has been described above, it is possible to delete the various items displayed on the first display screen 200 and the second display screen 300, such as the typed message 210, the handwritten event/appointment 310, the photograph 320, or the photo embellishment 330, in the same way as described above.

Also, although the case where a message is deleted in accordance with a drag operation by the user on a touch panel that is the operation unit 120 has been described above, as other examples it is also possible to delete a message in the same way as described above by a drag operation by a pointing device, such as a tablet or a mouse, or an operation such as pressing direction keys of a keyboard.

When information displayed on a corkboard, for example, is moved on the corkboard or is removed from the corkboard, the user can grasp the state of the information from changes that the user visually notices, even if unintentionally. As one example, when moving a document displayed on a corkboard, the document is first moved off the corkboard and therefore its appearance for a user facing the corkboard will change in that the document will float in front of the corkboard. However, on a screen that is an interface of an electronic communication device, it is difficult to visually grasp the state of information that is being moved or deleted.

The operations whereby messages are moved and deleted according to the first embodiment of the present disclosure described above solve the above problem. According to the operations whereby messages are moved and deleted according to the first embodiment of the present disclosure, a message that is being moved or deleted is displayed with some kind of visually different appearance. Accordingly, a user can easily carry out editing such as moving or deleting text or illustrations via intuitive operations.

2. Second Embodiment

Next, a second embodiment of the present disclosure will be described with reference to FIGS. 13 to 15. Note that according to the second embodiment of the present disclosure, although the reproduction process for messages differs compared to the first embodiment, the remaining functional configuration is substantially the same and therefore detailed description thereof is omitted.

FIGS. 13A to 13D are diagrams useful in explaining one example of a procedure whereby the handwritten message 220 is reproduced according to the second embodiment of the present disclosure. As shown in FIGS. 13A to 13D, the handwritten message 220 is reproduced in the order in which the message was written during input, that is, the handwritten message 220 is displayed as animation in order of an upper part 220a of a shoe, a sole part 220b of the shoe, a text part 220c for the characters "How", and a text part 220d for the characters "about this?". That is, the handwritten message 220 is reproduced by processing the message in accordance with the state of the input operation.

To reproduce the handwritten message 220 as animation, the recording control unit 142 records the handwritten message 220 together with the state of the input operation when the input operation by the user is acquired via the operation unit 120. For example, the recording control unit 142 may record, as the state of the input operation, the durations of the respective input operations for the parts 220a to 220d and store the durations in the storage unit 150. More specifically, during the input operation for the handwritten message 220, the durations from the start of the input operation to the respective ends of input of the parts 220a to 220d are recorded and stored in the storage unit 150. When reproducing the handwritten message 220 on the first display screen 200, the reproduction control unit 144 sets the durations from the start of reproduction of the animation of the handwritten message 220 until the displaying of the respective parts 220a to 220d at periods determined in accordance with the durations of the input operation.

Here, the reproduction control unit 144 may reproduce the animation of a message so that for intervals in the input of a message during the input operation, the duration of reproduction is shorter than the duration of the input operation. In such case, in the illustrated example, the durations during reproduction for the intervals between the input of the parts 220a to 220d in the input operation are set shorter than the durations during the input operation. More specifically, if the duration of an interval from the end of input of the part 220a to the start of input of the part 220b is three seconds during the input operation, the reproduction control unit 144 may set the duration of the reproduction of such interval at 0.5 seconds which is shorter than the duration of the input operation. In this case, the relationship between the duration during an input operation and the duration during reproduction may be set with consideration to the difference in perception of time to the user between when a message is being recorded and when a message is being reproduced. For example, although a user will be thinking while making an input when a message is recorded and therefore will not be especially conscious of the passage of time during an interval in input, when a message is being reproduced, the user will want to see the message and will therefore be conscious of the passage of time during an interval in reproduction. This means that if intervals are long, the reproduction may feel sluggish to the user.

The reproduction control unit 144 may also reproduce an entire message and an animation of the message in parallel. In the illustrated example, the reproduction control unit 144 first displays the entire handwritten message 220 using colors that are fainter than normal or colors that have a specified transparency. At the same time, the reproduction control unit 144 reproduces the parts 220a to 220d in order. When doing so, the animation of the handwritten message 220 is reproduced so as to trace the entire handwritten message 220 that is already being faintly displayed. Alternatively, the reproduction control unit 144 may first display the entire message using the normal colors before gradually fading the colors of the message and then displaying the animation of the message.

Figure 14:
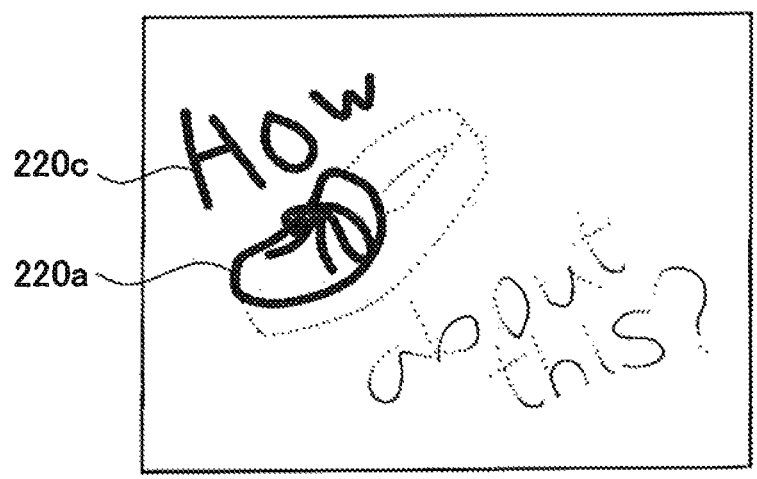
FIG. 14 is a diagram useful in explaining another example of a procedure whereby a handwritten message is reproduced according to the same embodiment.

FIG. 14 is a diagram useful in explaining another example of a procedure where the handwritten message 220 is reproduced according to the second embodiment of the present disclosure. As shown in FIG. 14, out of the handwritten message 220, the upper part 220a of the shoe and the text part 220c for the characters "How" are reproduced as animation at the same time.

In the example described above, the reproduction control unit 144 divides the message into specified parts and reproduces an animation of the specified parts in parallel. In the illustrated example, out of the handwritten message 220, the reproduction control unit 144 reproduces the part 220a of the drawing of the shoe and the text part 220c for the characters "How" in parallel. Here, the reproduction control unit 144 divides the handwritten message 220 into specified parts composed of the "drawing parts 220a, 220b" and the "text parts 220c, 220d" and reproduces the respective parts in parallel as an animation. As the specified parts, as examples the reproduction control unit 144 may divide a message into continuous parts (as examples, a plurality of parts that are graphically connected or parts that were generated by an input operation with no intervals in between) or parts generated by input operations with different colors.

Note that in the example described above, as described earlier, the reproduction control unit 144 may make the durations of intervals in input shorter during reproduction than the durations during the input operation or display the entire message in parallel to the animation of the message.

Note that although the case where the handwritten message 220 is reproduced as animation has been described above with reference to FIGS. 13 and 14, it is possible to reproduce the various items displayed on the first display screen 200 and the second display screen 300, such as the typed message 210, the handwritten event/appointment 310, the photograph 320, or the photograph embellishment 330, as animations in the same way. In the case of the typed message 210 for example, the recording control unit 142 may record the timing of keystrokes of a keyboard that constructs the operation unit 120, for example, as the state of the input operation. In such case, the typed message 210 is reproduced as animation by recreating the timing when the message was typed.

When a plurality of messages are displayed on the first display screen 200 and the second display screen 300, the reproduction control unit 144 may reproduce an animation for only a specified message selected out of the plurality of messages. As one example, the specified message may be a message that has just been subjected to an input operation or a movement operation. When the user has not operated the operation unit 120, the reproduction control unit 144 may select one message randomly as the specified message and display such message as an animated display. On the first display screen 200, for example, the reproduction control unit 144 may select the specified message in order from the oldest of the recorded messages so as to reproduce animation for all of the messages in a time series. In this way, by reproducing animation for only a specified message, it is possible to prevent the entire display from appearing messy and confusing.

Figure 15:
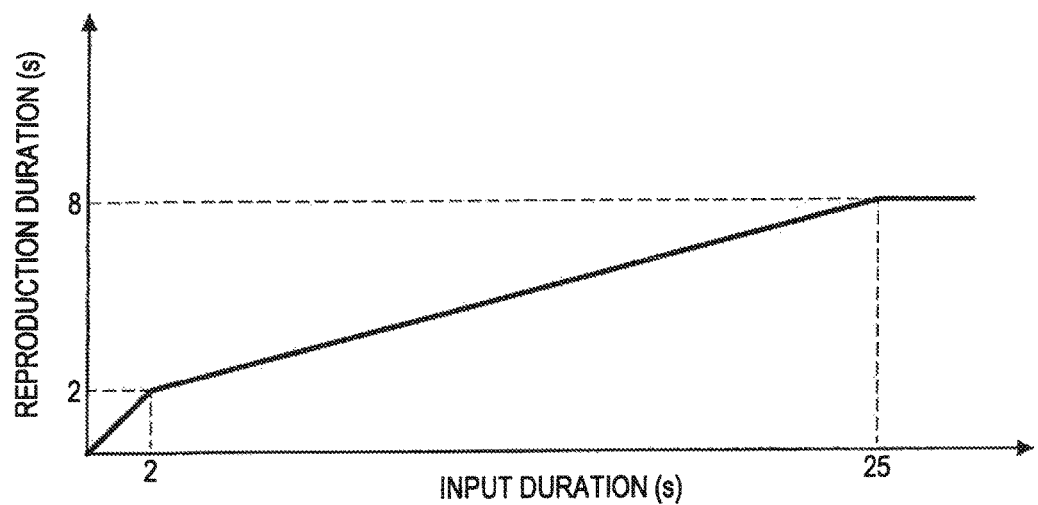
FIG. 15 is a graph showing one example of the relationship between the duration of an input operation of a message and the duration of reproduction according to the same embodiment.

FIG. 15 is a graph showing one example of the relationship between the duration of an input operation of a message and the duration of reproduction according to the second embodiment of the present disclosure. As shown in FIG. 15, the duration of reproduction is adjusted in accordance with the duration of an input operation.

More specifically, in a first region where the duration of the input operation is no longer than a first specified threshold of two seconds, the reproduction control unit 144 sets the duration of reproduction at the same time as the duration of the input operation. In a second region where the duration of the input operation is longer than two seconds but is no longer than a second specified threshold of twenty-five seconds, the reproduction control unit 144 sets the duration of reproduction shorter than the duration of the input operation. In a third region where the duration of the input operation is longer than twenty-five seconds, the reproduction control unit 144 sets the duration of reproduction at a fixed value regardless of the duration of the input operation.

Note that although the reproduction control unit 144 converts the duration of the input operation to the duration of reproduction using a linear function in the second region described above, a non-linear conversion may be carried out using Bezier curves, for example. The first specified threshold and the second specified threshold described above may also be set at arbitrary values. The duration of reproduction does not need to be adjusted using the three regions described above, and only the first and second regions, the second and third regions, or the first and third regions may be set.

By adjusting the duration of reproduction as in the illustrated example, it is possible to compensate the difference in user's perception of time between when a message is recorded and when a message is reproduced and prevent the user from feeling that the animated reproduction of a message is sluggish.

Figure 16:
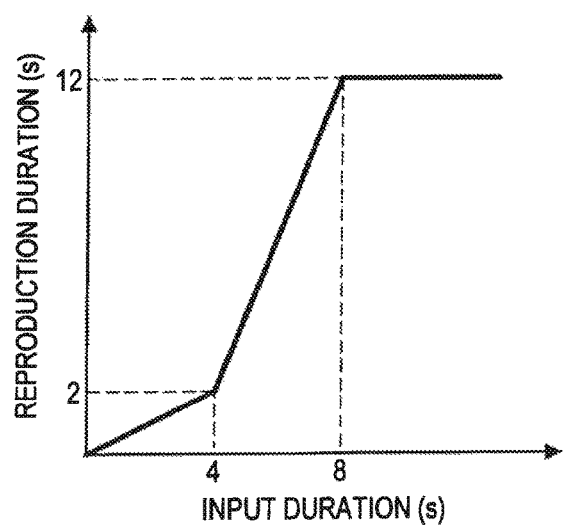
FIG. 16 is a graph showing another example of the relationship between the duration of an input operation of a message and the duration of reproduction according to the same embodiment.

FIG. 16 is a graph showing another example of the relationship between the duration of an input operation and the duration of reproduction for a message according to the second embodiment of the present disclosure. As shown in FIG. 16, the duration of reproduction is adjusted in accordance with the duration of an input operation.

More specifically, in a first region where the duration of the input operation is no longer than a first specified threshold of four seconds, the reproduction control unit 144 sets the duration of reproduction shorter than the duration of the input operation. In a second region where the duration of the input operation is longer than the specified threshold of four seconds but is no longer than a second specified threshold of eight seconds, the reproduction control unit 144 sets the duration of reproduction longer than the duration of the input operation. In a third region where the duration of the input operation is longer than eight seconds, the reproduction control unit 144 sets the duration of reproduction at a fixed value regardless of the duration of the input operation.

Note that although the reproduction control unit 144 converts the duration of the input operation to the duration of reproduction using a linear function in the first and second regions described above, a non-linear conversion may be carried out using Bezier curves, for example. The specified thresholds described above may be set at arbitrary values. The duration of reproduction does not need to be adjusted using the three regions described above, and only the first and second regions, the second and third regions, or the first and third regions may be set.

By adjusting the duration of reproduction as in the example described above, when the duration of an input operation is short, the duration of reproduction is made even shorter, while when the duration of an input operation is long, the duration of reproduction is made even longer. That is, parts that were inputted quickly during an input operation are displayed more quickly and parts that were inputted slowly are displayed more slowly so as to be displayed with an exaggerated input speed. If the third region described above is set, it is possible to prevent the duration of reproduction from becoming endlessly long and also restrict the exaggeration of the input speed to a range that is still realistic.

Note that the adjustments to the duration of reproduction described above with reference to FIGS. 15 and 16 may be combined with one another. That is, it is possible to set a combination of a part where the duration of reproduction is shortened, a part where the duration of reproduction is extended, and a part where the duration of reproduction is fixed as appropriate in accordance with the user's perception during reproduction.

With electronic communication devices, it has not been easy for posters of information to express their intentions and feelings using elements aside from the direct content of messages. For example, even when a handwritten message has been stored as an image, it has not been possible to sufficiently express the atmosphere/mood or intention or feelings of the poster when the message was recorded.

The reproduction process for a message according to the second embodiment of the present disclosure described above solves this problem. By using a configuration where the reproduction control unit 144 of the information processing apparatus 100 according to the present embodiment processes and reproduces a message in accordance with the state of an input operation, the state of the input operation when the message was recorded is reflected in the reproduction of the message as animation, for example. Accordingly, it is possible for a user (poster) who records a message to better express the atmosphere/mood or the poster's intention and/or feelings when the message is recorded, and possible for a user who reproduces a message to feel such atmosphere/mood or intention and/or feelings. It is also possible to change dynamic elements such as the speed and order of input in addition to static elements such as the content of the message, the writing, the color, and decorations, which makes it more fun for users to record and reproduce messages.

In addition, by using a configuration where the reproduction control unit 144 reproduces messages with a duration of reproduction in accordance with the duration of the input operation, it is possible as examples to express a part that the poster of a message wishes to emphasize or a part that is of concern using the speed at which a reproduced message is displayed.

Also, by using a configuration where the reproduction control unit 144 sets the duration of reproduction of an interval in input shorter than the duration during the input operation, it is possible to prevent the animation when reproducing a message from becoming sluggish due to gaps and possible to reduce the duration of reproduction while maintaining the atmosphere/mood from the time of the input operation.

By using a configuration where the reproduction control unit 144 reproduces the entire message in parallel with an animation of the message, it is possible even during the display of animation to display the entire message so as to be at least partially visible and thereby enable the user to quickly grasp the content of the message.

Also, by using a configuration where the reproduction control unit 144 divides a message into specified parts and reproduces the units in the respective parts in parallel, it is possible to reduce the duration of reproduction while maintaining at least some of the atmosphere/mood during the input operation.

By using a configuration where the reproduction control unit 144 makes the duration of reproduction of a message shorter than the duration of the input operation when the duration of the input operation exceeds the first specified threshold, it is possible, even for a message whose input operation took a long time, to produce an animated display that reflects the difference in input speed while preventing the reproduced animation from being too long.

Also, by using a configuration where the reproduction control unit 144 sets the duration of reproduction of a message at a fixed time regardless of the duration of an input operation when the duration of the input operation exceeds the second specified threshold, it is possible, even for a message whose input operation took a long time, to prevent the duration of reproduction from becoming endlessly long and also restrict the exaggeration of the input speed to a range that is still realistic.

By using a configuration where the reproduction control unit 144 sets the duration of reproduction of a message shorter than the duration of the input operation when the duration of the input operation is shorter than the third specified threshold, it is possible to reproduce a part that was quickly inputted during an input operation even more quickly and thereby emphasize the speed of input.

Also, by using a configuration where the reproduction control unit 144 sets the duration of reproduction of a message longer than the duration of the input operation when the duration of the input operation exceeds a fourth specified threshold, it is possible to reproduce a part that was slowly inputted during the input operation even more slowly and thereby emphasize the slow speed of the input.

3. Third Embodiment

Next, a third embodiment of the present disclosure will be described with reference to FIGS. 17 to 19. Note that although the third embodiment of the present disclosure differs to the first and second embodiments in that the information processing apparatus is additionally equipped with a communication unit, the remaining functional configuration is substantially the same as the first and second embodiments and therefore detailed description thereof is omitted.

Figure 17:
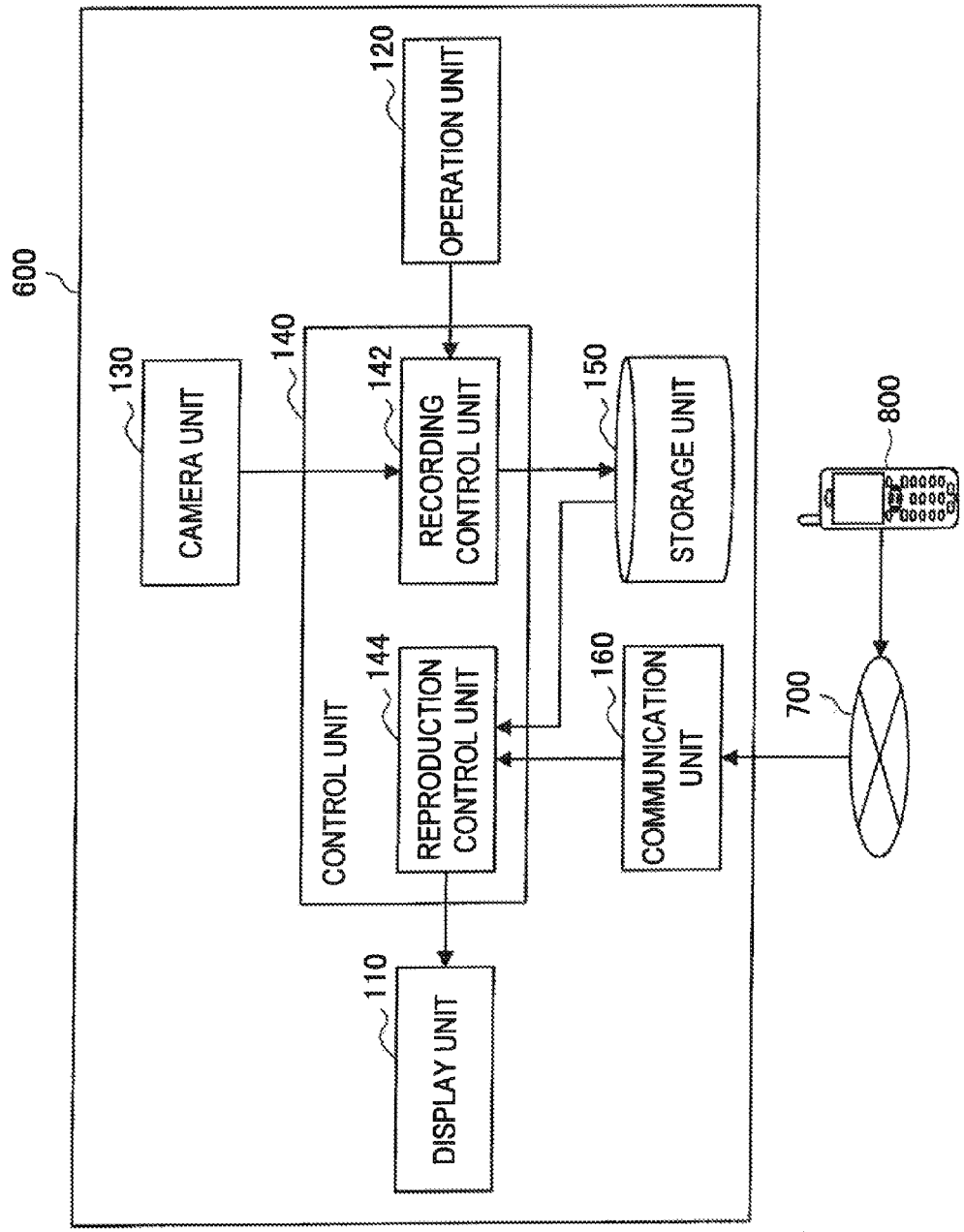
FIG. 17 is a block diagram showing the functional configuration of an information processing apparatus according to a third embodiment of the present disclosure.

FIG. 17 is a block diagram showing the functional configuration of an information processing apparatus 600 according to a third embodiment of the present disclosure. As shown in FIG. 17, the information processing apparatus 600 includes the display unit 110, the operation unit 120, the control unit 140, the storage unit 150, and the communication unit 160, and may additionally include the camera unit 130 as necessary.

The communication unit 160 communicates with another information processing apparatus 800 via a server on a network 700. The communication unit 160 may be a network interface such as a LAN (Local Area Network) or a USB. The communication unit 160 receives messages recorded by the other information processing apparatus 800. The other information processing apparatus 800 may be one of various types of apparatus that are capable of generating messages, such as a mobile terminal or a personal computer. Also, the other information processing apparatus 800 may be an information processing apparatus with the same configuration as the information processing apparatus 600.

Figure 18:
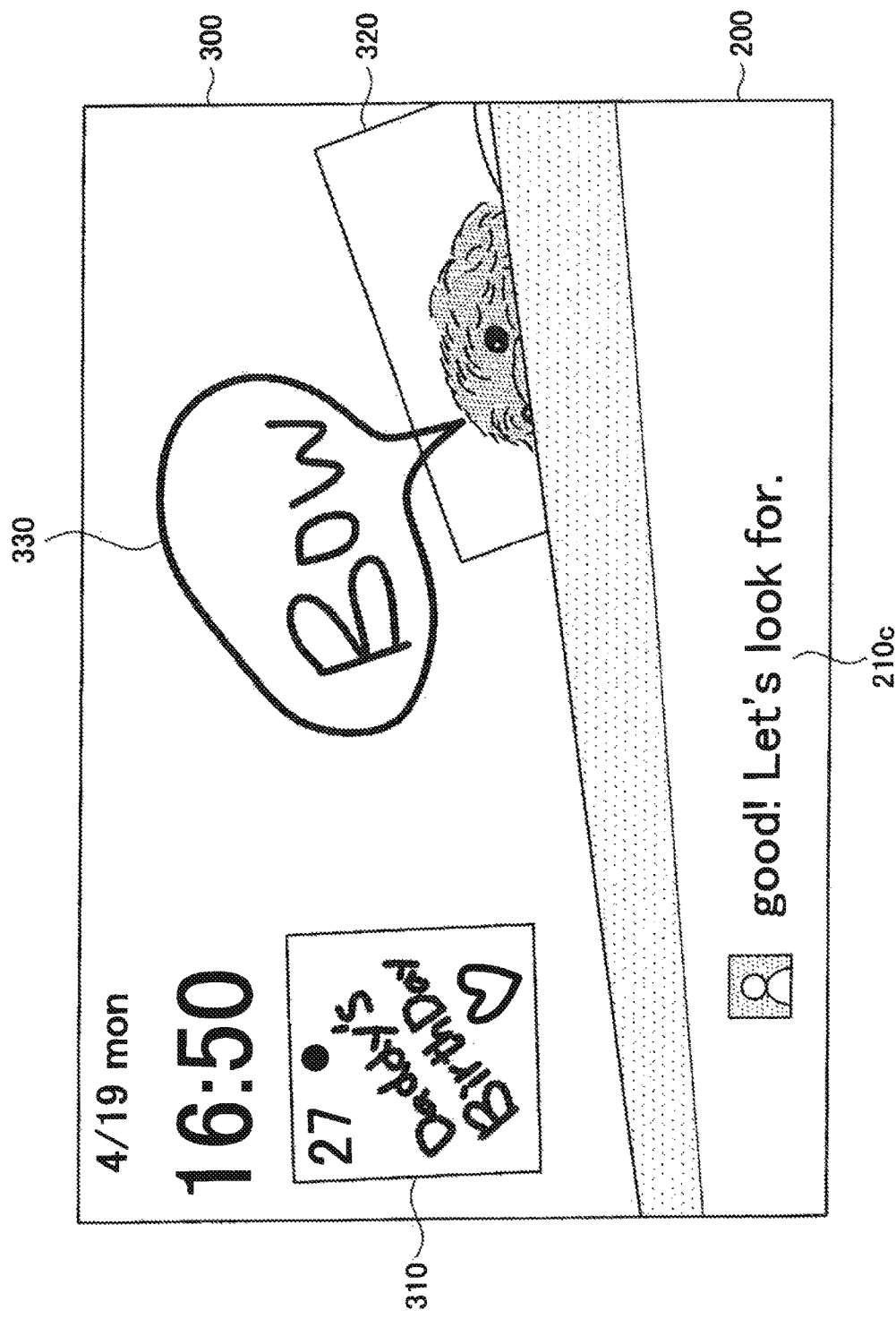
FIG. 18 is a diagram showing one example of a display screen according to the same embodiment.

FIG. 18 is a diagram showing one example of a display screen according to the third embodiment of the present disclosure. As shown in FIG. 18, a new message 210c recorded by the other information processing apparatus 800 is displayed in the first display screen 200.

The new message 210c is transmitted from the information processing apparatus 800 and received by the communication unit 160. The communication unit 160 sends the new message 210c to the reproduction control unit 144 and the reproduction control unit 144 displays the new message 210c on the display unit 110.

The new message 210c may be a typed message as shown in the drawing, or may be a handwritten message, a handwritten event/appointment, a photograph, or a photograph embellishment. When the new message 210c is a typed message, as shown in the drawing the message may be accompanied by an icon showing the poster of the message.

Here, if the new message 210c received from the other information processing apparatus 800 has been acquired from the communication unit 160, the reproduction control unit 144 may display the new message 210c at the bottom of the first display screen 200. Here, the reproduction control unit 144 scrolls the typed message 210a and the handwritten message 220 that were already being displayed in the direction of the oldest message on the display (i.e., the typed message 210a) by a distance corresponding to the display area of the new message 210c at the bottom of the first display screen 200. When the user makes some kind of operation after the new message 210c has been displayed, the new message 210c is incorporated into the historical log of messages and an operation such as moving or deleting the message in the same way as other messages becomes possible.

When the second display screen 300 is being displayed on substantially all of the display unit 110, the reproduction control unit 144 may automatically change the display proportions of the first display screen 200 and the second display screen 300 and set the bottom of the screen as the first display screen 200 so as to display the new message 210c. When doing so, a visual effect where the second display screen 300 that is displayed on top of the first display screen 200 appears to be peeled off may be displayed.

Figure 19:
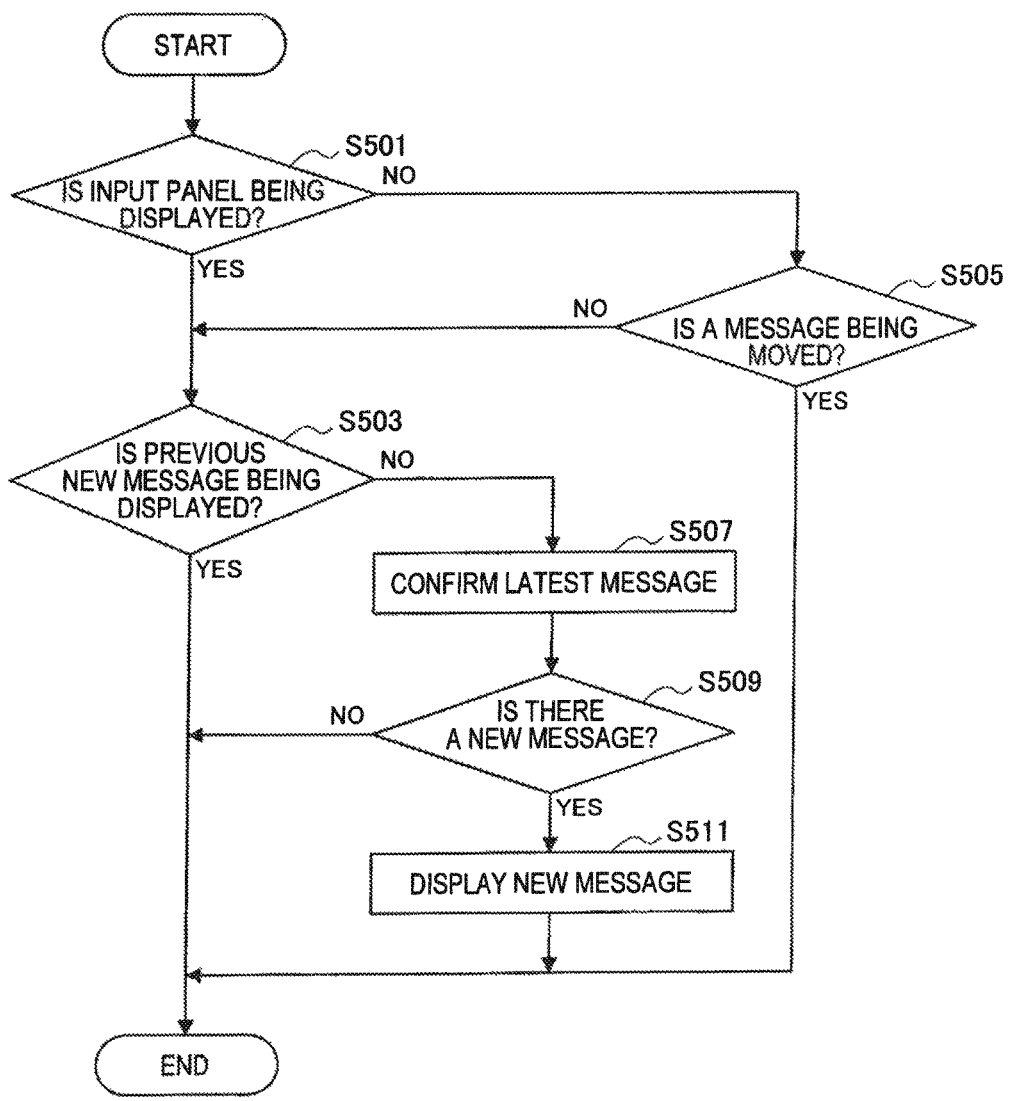
FIG. 19 is a flowchart useful in describing a display process for a new message according to the same embodiment.

FIG. 19 is a flowchart useful in describing a display process for the new message 210c according to the third embodiment of the present disclosure. As shown in FIG. 19, the reproduction control unit 144 carries out a process that displays the new message 210c while avoiding conflict with other operations or displaying.

First, the reproduction control unit 144 judges whether the input panel 400 is being displayed (step S501). Here, if it is judged that the input panel 400 is being displayed, the reproduction control unit 144 judges whether a previous new message is being displayed (step S503). Meanwhile, if it is judged that the input panel 400 is not being displayed, the reproduction control unit 144 judges whether a message is being moved by a user operation on the operation unit 120 (step S505).

If it is judged in step S505 that the user is moving a message, the reproduction control unit 144 ends the processing so as to avoid conflict between the message moving operation and the displaying of the new message 210c. Meanwhile, if it is judged that the user is not moving a message, the reproduction control unit 144 judges whether a previous new message is being displayed (step S503).

If it is judged in step S503 that a previous new message is being displayed, the reproduction control unit 144 ends the processing so as to avoid conflict with the displaying of a new message that was previously received but has not been confirmed by the user. Meanwhile, if it is judged that a previous new message is not being displayed, the reproduction control unit 144 confirms the new message 210c received by the communication unit 160 (step S507).

Next, in step S509, the reproduction control unit 144 judges whether there is a new message 210c that has been received by the communication unit 160 (step S509). Here, if it is judged that there is a new message 210c, the reproduction control unit 144 displays the new message 210c (step S511) and ends the processing.

Meanwhile, if it is judged that there is no new message, the reproduction control unit 144 ends the processing.

According to the configuration of the display screen according to the third embodiment of the present disclosure described above, it is possible to obtain the same effect as the first and second embodiments of the present disclosure for messages that have been received via a network. However, when a message received via a network is displayed, there is a potential problem of such message obstructing an operation, that is, interrupting an operation such as input, movement, or deletion of a message on the information processing apparatus 600.

In such case, the configuration of the present embodiment that displays the new message 210c while avoiding conflict with other operations or displaying is effective. By using such configuration, the reproduction control unit 144 suppresses the displaying of the new message until a process such as the inputting, moving, or deleting of a message on the information processing apparatus 600 ends. Accordingly, it is possible to enable users to confirm a new message with time and without other distractions after a process such as the inputting, moving, or deleting of a message on the information processing apparatus 600 has ended. This makes it possible to reduce confirmation errors for new messages.

4. Appendix

It should be understood by those skilled in the art that various modifications, combinations, sub-combinations and alterations may occur depending on design requirements and other factors insofar as they are within the scope of the appended claims or the equivalents thereof As one example, although the information processing apparatus according to the third embodiment of the present technology has been described as receiving a message from the other information processing apparatus via a server on a network, the present technology is not limited to such example. As one example, an information processing apparatus may act as a server itself and directly receive a message from another information processing apparatus.

What is claimed:

1. An information processing apparatus comprising:
   a circuitry configured to
      initiate an acquisition of an input operation for a message comprising at least one of text and an image;
      record a duration of the input operation; and
      initiate a reproduction of the message to display the message on a display unit in accordance with the acquired input operation,
   wherein the display unit is configured to allow a plurality of users to interface with the information processing apparatus to publicly display messages on the display unit, and
   wherein, when the duration of the input operation exceeds a first threshold, an animation of the message is reproduced by making a duration of reproduction of the animation shorter than the duration of the input operation.

2. The information processing apparatus according to claim 1,
   wherein the animation of the message is reproduced by making the duration of reproduction shorter than the duration of the input operation for an interval in input of the message during the input operation.

3. The information processing apparatus according to claim 1,
   wherein an entire image of the message and the animation of the message are reproduced in parallel.

4. The information processing apparatus according to claim 1,
   wherein the message is divided into a plurality of parts and animation of the respective parts is reproduced in parallel.

5. The information processing apparatus according to claim 1,
   wherein the information processing apparatus further comprises the display unit.

6. The information processing apparatus according to claim 1,
   wherein the display unit is located remotely from the information processing apparatus.

7. The information processing apparatus according to claim 1,
   wherein the circuitry is further configured to
      initiate an acquisition of a second input operation for a second message comprising at least one of text and an image,
      wherein a reproduction of the second message to display the second message on the display unit is controlled so as to avoid conflict with the reproduction of the message or an operation performed on the message.

8. The information processing apparatus according to claim 7,
   wherein the circuitry is further configured to
   control the reproduction of the second message such that the second message is not being reproduced at a time concurrent with when the message is being reproduced or when the operation is being performed on the message.

9. The information processing apparatus according to claim 8,
   wherein the circuitry is further configured to
      initiate an ending of reproduction of the message prior to initiating the reproduction of the second message to display the second message on the display unit.

10. An information processing apparatus comprising:
    a circuitry configured to
       initiate an acquisition of an input operation for a message comprising at least one of text and an image;
       record a duration of the input operation; and
       initiate a reproduction of the message to display the message on a display unit in accordance with the acquired input operation,
    wherein the display unit is configured to allow a plurality of users to interface with the information processing apparatus to publicly display messages on the display unit, and
    wherein, when the duration of the input operation is shorter than a second threshold, an animation of the message is reproduced by making a duration of reproduction of the animation shorter than the duration of the input operation.

11. An information processing method comprising:
    acquiring an input operation for a message comprising at least one of text and an image;
    recording a duration of the input operation; and
    reproducing the message to display the message on a display unit in accordance with the acquired input operation,
    wherein the display unit is configured to allow a plurality of users to interface to publicly display messages on the display unit, and
    wherein, when the duration of the input operation exceeds a first threshold, an animation of the message is reproduced by making a duration of reproduction of the animation shorter than the duration of the input operation.

12. A non-transitory computer-readable medium having a program embodied thereon, which when executed by a computer causes the computer to execute an information processing method, the method comprising:
    acquiring an input operation for a message comprising at least one of text and an image;
    recording a duration of the input operation; and
    reproducing the message to display the message on a display unit in accordance with the acquired input operation,
    wherein the display unit is configured to allow a plurality of users to interface to publicly display messages on the display unit, and
    wherein, when the duration of the input operation exceeds a first threshold, an animation of the message is reproduced by making a duration of reproduction of the animation shorter than the duration of the input operation.

* * * * *